United States Patent
Andrews et al.

(10) Patent No.: US 12,120,028 B1
(45) Date of Patent: Oct. 15, 2024

(54) SECURE DATA ROUTING WITH CHANNEL RESILIENCY

(71) Applicant: SCATR LLC, Sheridan, WY (US)

(72) Inventors: John G. Andrews, Cleveland Heights, OH (US); Mikel Youssef Awad, Tampa, FL (US); Matthew William Carpenter, Aurora, OH (US); John P. Keyerleber, Richmond Heights, OH (US)

(73) Assignee: SCATR, Corp, Cleveland, OH (US)

( * ) Notice: Subject to any disclaimer, the term of this patent is extended or adjusted under 35 U.S.C. 154(b) by 0 days.

(21) Appl. No.: 18/194,413

(22) Filed: Mar. 31, 2023

(51) Int. Cl.
*H04L 45/74* (2022.01)
*H04L 9/40* (2022.01)
*H04L 45/24* (2022.01)
*H04L 67/1019* (2022.01)
*H04L 67/145* (2022.01)

(52) U.S. Cl.
CPC .............. *H04L 45/74* (2013.01); *H04L 45/24* (2013.01); *H04L 45/245* (2013.01); *H04L 63/0435* (2013.01); *H04L 67/1019* (2013.01); *H04L 67/145* (2013.01)

(58) Field of Classification Search
CPC ....... H04L 45/24; H04L 45/245; H04L 45/74; H04L 63/0435; H04L 67/1019; H04L 67/145
See application file for complete search history.

(56) References Cited

U.S. PATENT DOCUMENTS

| | | | | |
|---|---|---|---|---|
| 6,502,135 B1 * | 12/2002 | Munger | ................ | H04L 45/243 709/225 |
| 6,765,866 B1 * | 7/2004 | Wyatt | ..................... | H04L 49/30 370/229 |
| 6,990,111 B2 * | 1/2006 | Lemoff | ................... | H04L 45/26 370/408 |
| 7,382,782 B1 * | 6/2008 | Ferguson | ................ | H04L 45/60 718/105 |

(Continued)

OTHER PUBLICATIONS

Naeem Firdous Syed et al. "Zero Trust Architecture (ZTA): A Comprehensive Survey", 37 pages. (Year: 2022).*

(Continued)

*Primary Examiner* — George C Neurauter, Jr.
(74) *Attorney, Agent, or Firm* — Conley Rose, P.C.; Michael W. Piper; Elexis A. Jones

(57) ABSTRACT

A secure data routing method and system are disclosed. Logical communication channels are established that each associate an IP address and a protocol port associated with a first computer system to an IP address and a protocol port associated with a second or third computer system. Some logical communication channels associated with the second computer system and some logical communication channels associated with the third computer system are associated with the same IP address and protocol port associated with the first computer system. Data packets are received and parsed to find tokens embedded in the headers. A first data packet embedding a first token is associated to a first source and is decrypted using a first decryption key associated with (Continued)

the first source. A second data packet embedding a second token is associated to a second source and is decrypted using a second decryption key associated with the second source.

12 Claims, 11 Drawing Sheets

(56) References Cited

U.S. PATENT DOCUMENTS

| | | | |
|---|---|---|---|
| 7,697,528 B2* | 4/2010 | Parry | H04L 12/4658 370/392 |
| 7,782,782 B1* | 8/2010 | Ferguson | H04L 47/522 709/225 |
| 7,895,348 B2 | 2/2011 | Twitchell, Jr. | |
| 7,984,495 B1 | 7/2011 | Aravind | |
| 8,274,980 B2* | 9/2012 | Sato | H04L 45/745 370/465 |
| 8,358,658 B2* | 1/2013 | Flynn | G06F 13/4022 370/387 |
| 8,416,686 B2* | 4/2013 | Ferguson | H04L 47/10 370/395.41 |
| 8,955,110 B1 | 2/2015 | Twitchell, Jr. | |
| 9,116,734 B1 | 8/2015 | Twitchell, Jr. et al. | |
| 9,185,046 B2* | 11/2015 | Ferguson | H04L 45/60 |
| 9,225,699 B2* | 12/2015 | Biradar | H04L 63/068 |
| 9,241,026 B2 | 1/2016 | Twitchell, Jr. | |
| 9,495,194 B1 | 11/2016 | Twitchell, Jr. et al. | |
| 9,535,805 B2* | 1/2017 | Ananthanarayanan | H04L 67/1019 |
| 9,629,063 B2* | 4/2017 | Brown | H04W 40/30 |
| 10,432,526 B2* | 10/2019 | Gafni | H04L 12/4645 |
| 10,469,375 B2 | 11/2019 | Twitchell, Jr. | |
| 10,541,907 B2 | 1/2020 | Twitchell, Jr. et al. | |
| 10,637,685 B2* | 4/2020 | Goel | H04L 49/70 |
| 10,686,729 B2* | 6/2020 | Sindhu | H04L 49/113 |
| 10,826,711 B2 | 11/2020 | Barry | |
| 10,833,972 B2 | 11/2020 | Vaughan et al. | |
| 10,904,367 B2* | 1/2021 | Goel | H04L 69/324 |
| 10,965,586 B2* | 3/2021 | Goel | H04L 47/122 |
| 11,153,276 B1 | 10/2021 | Keyerleber | |
| 11,178,262 B2* | 11/2021 | Goel | H04L 45/16 |
| 11,381,557 B2* | 7/2022 | Kim | H04L 63/0209 |
| 11,469,922 B2* | 10/2022 | Goel | H04L 45/62 |
| 11,533,617 B2* | 12/2022 | Mihelich | H04L 41/12 |
| 11,558,422 B2 | 1/2023 | Twitchell, Jr. et al. | |
| 11,601,359 B2* | 3/2023 | Goel | H04L 45/22 |
| 11,777,839 B2* | 10/2023 | Sindhu | H04L 45/24 370/235 |
| 11,895,015 B1* | 2/2024 | Budhia | H04L 45/42 |
| 2001/0050914 A1 | 12/2001 | Akahane et al. | |
| 2001/0054158 A1 | 12/2001 | Jarosz | |
| 2003/0112755 A1 | 6/2003 | McDysan | |
| 2004/0103205 A1 | 5/2004 | Larson et al. | |
| 2010/0149988 A1 | 6/2010 | Matsubara et al. | |
| 2011/0179136 A1 | 7/2011 | Twitchell, Jr. | |
| 2015/0326603 A1 | 11/2015 | Deisinger et al. | |
| 2015/0350245 A1 | 12/2015 | Twitchell, Jr. et al. | |
| 2017/0126626 A1 | 5/2017 | Datta et al. | |
| 2018/0316598 A1 | 11/2018 | Twitchell, Jr. | |
| 2019/0294464 A1 | 9/2019 | Twitchell, Jr. et al. | |
| 2020/0014619 A1 | 1/2020 | Shelar et al. | |
| 2021/0297351 A1* | 9/2021 | Vegesna | H04L 49/90 |
| 2022/0247678 A1* | 8/2022 | Atwal | H04L 45/645 |
| 2023/0164086 A1* | 5/2023 | York | H04L 45/24 370/392 |
| 2023/0198914 A1* | 6/2023 | Ranjan | H04L 45/304 370/392 |
| 2023/0208748 A1* | 6/2023 | Goel | H04L 43/0817 370/242 |
| 2024/0028367 A1* | 1/2024 | Mathew | G06F 9/45558 |

OTHER PUBLICATIONS

Tao Shu et al. "Secure Data Collection in Wireless Sensor Networks Using Randomized Dispersive Routes", IEEE Transactions on Mobile Computing, vol. 9, No. 7, Jul. 2010, 14 pages. (Year: 2010).*
Notice of Allowance dated Jun. 22, 2021, U.S. Appl. No. 16/683,146, filed Nov. 13, 2019.
Office Action dated Apr. 12, 2023, U.S. Appl. No. 17/481,914, filed Sep. 22, 2022.
Final Office Action dated Jul. 24, 2023, U.S. Appl. No. 17/481,914, filed Sep. 22, 2022.
Keyerleber, John P., et al., "Secure Data Routing and Randomization," filed Sep. 22, 2021, U.S. Appl. No. 17/481,914.
Andrews, John G., et al., "Out of Band Key Exchange," filed Jun. 30, 2023, U.S. Appl. No. 18/345,819.
Andrews, John G., et al., "Network Traffic Obfuscation," filed Jun. 30, 2023, U.S. Appl. No. 18/345,829.
Andrews, John G., et al., "Endpoint Validation Security," filed Jun. 30, 2023, U.S. Appl. No. 18/345,837.
Andrews, John G., et al., "Secure Data Routing With Dynamic Packet Spoofing," filed Jun. 30, 2023, U.S. Appl. No. 18/345,847.
"Andrews, John G., et al., ""Secure Data Routing andRandomization in Windows,"" filed Jul. 28, 2023, U.S. Appl. No. 18/361,721."
Advisory Action dated Oct. 5, 2023, U.S. Appl. No. 17/481,914, filed Sep. 22, 2022.
Examiner's Answer to Appeal Brief dated Feb. 23, 2024, U.S. Appl. No. 17/481,914, filed Sep. 22, 2022.
Keyerleber, John P., "Machine Learning Driven Network Traffic Obfuscation," filed Jan. 24, 2024, U.S. Appl. No. 18/421,960.
Keyerleber, et al., "Optimizing Network Traffic Obfuscation Based on Network Performance Using Reinforcement Learning," filed Jan. 24, 2024, U.S. Appl. No. 18/421,965.
Keyerleber, et al., "Optimizing Network Traffic Obfuscation Based on Aggregated Network Performance," filed Jan. 24, 2024, Application No. Jan. 24, 2024.

* cited by examiner

SECURE DATA ROUTING WITH CHANNEL RESILIENCY

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Data transmitted between two computing systems may travel via defined paths or routes, through any of a variety of publicly accessible networks (e.g., the Internet), and may use any of a variety of media, such as Ethernet or fiber cabling. In known methods of data transmission across networks, data routing is performed based on an external Internet protocol (IP) address. Data packets are generally forwarded across multiple routers to the requested IP address by the fastest path available at the time of transmission, with the packet's destination visible upon inspection.

Whenever data is moved between two points, there is a potential risk of unauthorized access to that data by an eavesdropper or other unauthorized actor. Conventional techniques to secure the transmission of confidential information typically rely upon data being encrypted by a sufficiently complex single encryption algorithm. For example, a virtual private network (VPN) establishes a virtual point-to-point connection (e.g., a so-called "secure tunnel") in which data is encrypted when it leaves one location and is decrypted at its destination, where both source and destination are identified by unique, attributable IP addresses. Any intermediate stops (hops) are also identifiable by their assigned IP address.

In the scenario above, two types of unauthorized users may attempt to access the transmitted data. First, an unauthorized user with access to an applicable encryption key (e.g., an employee of the source client that generated the data or a knowledgeable malicious actor) could observe the transmission and be able to decrypt and read the entirety of the communication. Next, an unauthorized user with no access to the applicable encryption key (e.g., an eavesdropper) may not be able to read the actual content of a communication, but may still be able to derive relevant information about the data transmission merely from observation, such as one or more of its destination, its source, its intermediate hops, the relative size (number of packets) of the transmission, the transmission type (e.g., based on destination port), and the like. Either of these bad actors could observe, capture, manipulate, divert, and/or log information about these types of transmissions. What is more, even with respect to an eavesdropper that does not have an encryption key, the actual content of a transmission may not be safe, as it is possible that a previously-accessed encrypted transmission may later become accessible. As computing resources improve, increasingly complex methods of encryption are subject to being "cracked" or broken, rendering such encryption useless. Once the encryption algorithm is broken, a hacker may be able to read unauthorized data that they previously obtained and stored.

SUMMARY

In an embodiment, a scatter network device is disclosed. The device comprises a non-transitory memory, an at least one physical interface, an at least one processor, and a scattering application stored in the non-transitory memory. When executed by the processor the scattering application establishes a plurality of logical communication channels, wherein each logical communication channel associates one of the at least one physical interface, a source Internet protocol (IP) address, and a destination IP address, receives a plurality of data packets from a first user system, scatters the plurality of data packets across the plurality of logical communication channels by sending at least some of the plurality of data packets via different logical communication channels to a counterpart scatter network device, and, for each logical communication channel, when the logical communication channel has been idle for a predefined period of time, sends a heartbeat packet via the logical communication channel to the counterpart scatter network device.

In another embodiment, a method of secure data routing is disclosed. The method comprises establishing a first plurality of logical communication channels by a scattering application executing on a first computer system, wherein each of the first plurality of communication channels associates an Internet protocol (IP) address and a protocol port associated with the first computer system to an IP address and a protocol port associated with a second computer system; and establishing a second plurality of logical communication channels by the scattering application, wherein each of the second plurality of logical communication channels associates an IP address and a protocol port associated with the first computer system to an IP address and a protocol port associated with a third computer system and wherein at least some of the second plurality of logical communication channels are associated with the same IP address and protocol port associated with the first computer system that some of the first plurality of logical communication channels are associated with. The method further comprises receiving a plurality of data packets by the scattering application via an IP address and a protocol port of the first computer system that is associated with one of the first plurality of logical communication channel and also associated with one of the second plurality of logical communication channels, parsing the data packets by the scattering application to find identification tokens embedded in the headers of the data packets, and associating a first data packet embedding a first identification token to a first data packet source. The method further comprises decrypting the first data packet using a first decryption key associated with the first data packet source; associating a second data packet embedding a second identification token to a second data packet source; and decrypting the second data packet using a second decryption key associated with the second data packet source.

In yet another embodiment, a scatter network is disclosed. The scatter network comprises a first scatter network node comprising a first non-transitory memory, at least a first processor, and a scatter network node application stored in the first non-transitory memory that, when executed by the at least the first processor of the first scatter network node, establishes a first plurality of logical communication channels, wherein each logical communication channel of the first plurality of logical communication channels associates a source Internet protocol (IP) address and a destination IP address and scatters a first plurality of data packets received from a data messaging source across the first plurality of logical communication channels by sending at least some of the first plurality of received data packets via different ones of the first plurality of logical communication channels to a counterpart scatter network node. The scatter network further comprises a first scatter network relay comprising a second non-transitory memory, at least a second processor, and a scatter network relay application stored in the second non-transitory memory that, when executed by the at least the second processor of the first scatter network relay, establishes a second plurality of logical communication channels, wherein each logical communication channel of the second plurality of logical communication channels associates a source Internet protocol (IP) address and a destination IP address, receives a second plurality of data packets from the first scatter network node via one of the first plurality of logical communication channels, wherein the second plurality of data packets is a sub-set of the first plurality of data packets, and scatters the second plurality of data packets across the second plurality of logical communication channels by sending at least some of the second plurality of data packets via different ones of the second plurality of logical communication channels to the counterpart scatter network node.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1A:
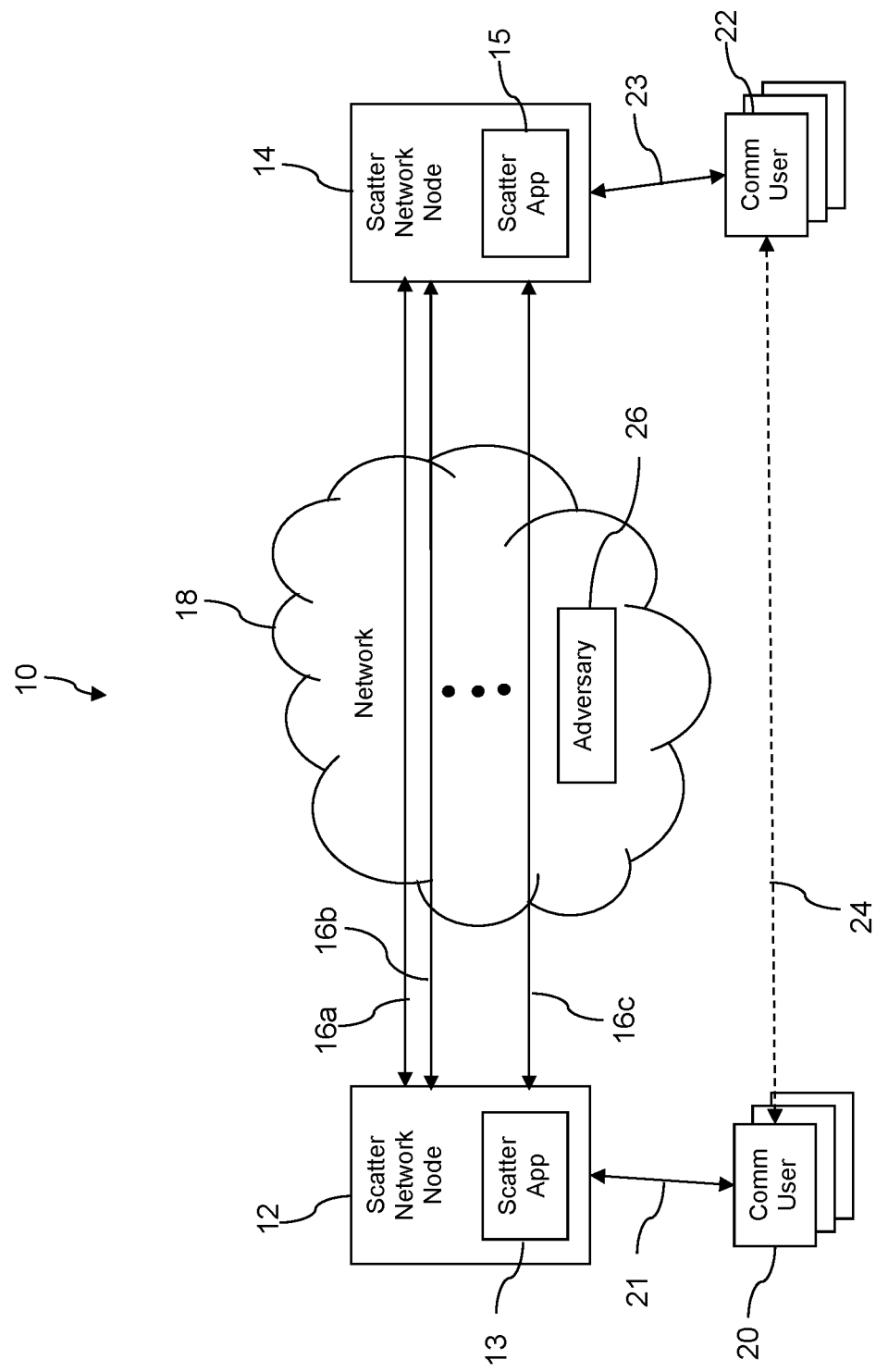
FIG. 1A is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The disclosure teaches a variety of elaborations and extensions of scatter networking technology. Communication between a source and a destination via the Internet or other communication network may be scattered by a collaborating pair of scatter network nodes. The source may be a first user device such as a mobile phone or a laptop computer; the destination may be a second user device such as a mobile phone or a laptop computer. Alternatively, the source may be the first user device and the destination may be a server application such as a social networking application executing on computer system or in a cloud computing environment or a financial services application executing on a computer system or in a cloud computing environment.

A first scatter network node of the collaborating pair of scatter network nodes may hide the true IP address of the source and the true IP address of the destination. The first scatter network node sends a plurality of data packets sent by the source to the destination across a plurality of different logical communication channels via a network that may be a combination of private and public networks. Each different logical communication channel is defined, in part, by a source IP address that is different from the true IP address of the source and a destination IP address that is different from the true IP address of the destination. The first scatter network node and a second scatter network node of the collaborating pair of scatter network nodes can agree in advance on the configuration of the different logical channels and the mapping of these logical channels to the true IP addresses of the source and destination. The first and second scatter network nodes may be said to collaborate in that they are cooperating to map communications over the logical communication channels to the first and second user devices whereby to conceal the true IP addresses of the first and second user devices. In an embodiment, the first user device may be associated with a subnet which hosts a plurality of other user devices which also communicate via the first scatter network node and the second scatter network node to one or more destination user devices or server applications.

The second scatter network node may also hide the true IP addresses of the first scatter network node (e.g., the IP addresses associated with the first scatter network node in the definitions of the plurality of logical communication channels between the two scatter network nodes). For example, an adversary surveilling data packets sent by the second scatter network node to a social networking sever application (e.g., packets sent on behalf of the first scatter network node which has sent these same packets on behalf of the first user device) would not be able to learn that the data packets originated from an IP address associated to the first scatter network node. It is noted that an IP address potentially may be tracked to a particular location, for example to a particular building.

As an example, the source user device may have a first IP address, and the destination user device may have a second IP address. Four logical communication channels between the first scatter network node and the second scatter network node may be defined as a first logical communication channel between a third IP address and a fourth IP address, a second logical communication channel between the third IP address and a fifth IP address, a third logical communication channel between a sixth IP address and the fourth IP address, and a fourth logical communication channel between the sixth IP address and the fifth IP address. The first scatter network node sends data packets received from the first user device directed to the second user device in IP packets whose header identifies a source IP address of either the third IP address or the sixth IP address and a destination IP address of either the fourth IP address or the fifth IP address. The second scatter network node sends data packets received from the second user device directed to the first user device in IP packets whose header identifies a source IP address of either the fourth IP address or the fifth IP address and a destination IP address of either the third IP address or the sixth IP address.

Which logical communication channel the first scatter network node or the second scatter network node chooses to send a given data packet through may be randomly selected by a scattering application that executes on the subject scatter network node. In this way, (A) the true IP address of the user devices is never presented to the Internet and (B) a plurality of data packets that form a message between the user devices is sent over different logical communication channels, making it difficult for eavesdroppers to associate these separate data packets to a single communication message. Different logical channels may be associated with different physical interfaces of the different scatter network nodes. Different physical interfaces may include one or more WiFi physical interfaces, one or more Bluetooth physical interfaces, one or more long-term evolution (LTE) physical interfaces, one or more 5G wireless physical interfaces, one or more wireless local area network (WLAN) physical interfaces, one or more Ethernet physical interfaces, and/or one or more satellite wireless physical interfaces (wireless interfaces linking to satellites located in space—either low earth orbit (LEO) satellites, geosynchronous satellites, or other satellites). Different physical interfaces may include Internet Protocol 6 Over Low-Power Wireless Personal Area Networks (6LoWPAN), Bluetooth, Bluetooth Low Energy (BLE), global system for mobile communications (GSM), LoRa, LTE, LTE-M, LTE-MTC, Narrowband IoT (NB-IoT), near field communication (NFC), WiFi Direct, Z-Wave, and/or Zigbee wireless physical interfaces. For further details of scattering network communications, see U.S. Pat. No. 11,153,276 B1 issued Oct. 19, 2021, titled "Secure Data Routing and Randomizing" by John P. Keyerleber which is hereby incorporated by reference herein in its entirety.

In an embodiment, the algorithm used by the scattering application executing on a scatter network node for selecting a logical communication channel may blend random selection with differential weighting of specific logical communication channels to achieve a pre-defined statistical distribution of packets across the logical communication channels over a sufficiently large population of sent packets. For example, such a weighting may randomly distribute packets across four different logical communication channels such that 35% of the packets pass over a first logical communication channel, 15% of the packets pass over a second logical communication channel, 20% of the packets pass over a third logical communication channel, and 30% of the packets pass over a fourth logical communication channel. It is understood that this is an exemplary pre-defined statistical distribution and different weightings may be used to achieve different preferred pre-defined statistical distributions of packets. It is understood that the differential weighting used by two collaborating scatter network nodes may be different at each one of the scatter network nodes when sending packets over the logical communication channels. It is understood that the differential weighting used by scatter network nodes may be changed at various points in time. Differential weighting of logical communication channel selection may be desired to take advantage of different performance characteristics of different physical interfaces associated with the different logical communication channels. Differential weighting of logical communication channel selection may be desired to mislead inferences made by adversaries monitoring the logical communication channels about the content carried over the logical communication channels.

In an embodiment, the first scatter network node may maintain transmit idle time counts of time since it last transmitted a data packet on each of the logical communication channels. Thus, the first scatter network node maintains a different transmit idle time count for each different logical communication channel. When the first scatter network node sends a data packet via a given logical communication channel, it resets the associated transmit idle time count to zero and begins counting again from zero. When any transmit idle time count exceeds a first predefined period of time, the first scatter network node may send a heartbeat data packet to the second scatter network node over the subject logical communication channel and resets the associated transmit idle time count to zero, whereby to assure the second scatter network node that the subject logical communication channel remains in operation.

The first scatter network node also maintains receive idle time counts of time since it last received a data packet on each of the logical communication channels. Thus, the first scatter network node maintains different receive idle time counts for each different logical communication channel. When the first scatter network node receives a data packet via a given logical communication channel (which may include receiving a heartbeat message sent by the second scatter network node), it resets the associated receive idle time count to zero and begins counting again from zero. If the receive idle time count associated with a given logical communication channel exceeds a second predefined period of time, the first scatter network node may mark the given logical communication channel as invalid and not include the given logical communication channel in its random selection of logical communication channels for sending data packets to the second scatter network node. The second scatter network node performs heartbeat generation and monitoring that reciprocates the heartbeat functions described above with reference to the first scatter network node. Use of the heartbeat exchanges described above can provide greater reliability and resilience of the logical communication channels between scatter network nodes. When a logical communication channel is deemed invalid, one or the other of the scatter network node may teardown the invalid channel and attempt to reestablish it again. Because the data packets are scattered across a plurality of logical communication channels, determining that a given logical communication channel has gone dead or is inoperable may be more difficult and data packets may undesirably be lost. Use of the heartbeat message promotes timely determination of faults in the logical communication channels and less clean-up work to resend data packets.

In an embodiment, the heartbeat message is carried in a scattering application datagram. To avoid eavesdroppers gleaning insight into communications over the logical communication channels, in an embodiment heartbeat messages are not discernibly different from other scattering application datagrams passing over the logical communication channels. For example, the data portion of the scattering application datagram implementing a heartbeat may contain content rather than being empty. For network efficiency, it may otherwise be desirable to minimize the data portion of a scattering application datagram, but this could signal to an eavesdropper something about the semantics of the scattering application datagram. Instead, as taught herein, in an embodiment, the heartbeat message carried in a scattering application datagram may comprise 5 or more bytes of information in the data portion, 10 or more bytes of information in the data portion, 20 or more bytes of information in the data portion, 50 or more bytes of information in the data portion, 200 or more bytes of information in the data portion, or some other number of bytes. The information in the data portion may be randomly generated '1' values and '0' values. The information in the data portion of the heartbeat messages may be referred to as padding in some contexts. In an embodiment, different heartbeat messages may be sent having different numbers of bytes in the data portion of the scattering application datagram. In an embodiment, the data portion of the heartbeat message in the scattering application datagram may be encrypted. Again, ordinarily a heartbeat message which analytically does not contain any bearer traffic might not be sent using encryption, whereby to reduce the processing burden inherent in performing encryption. Here the formally unnecessary encryption processing burden is accepted as a trade-off for increased obfuscation of the heartbeat function of the scattering application datagram.

In an embodiment, the data portion of the heartbeat messages may be used to carry useful information between the first and second scatter network nodes. For example, performance metrics on each logical communication channel may be determined by each scatter network node and the value of these performance metrics of all logical communication channels may be encoded in the data portion of the heartbeat messages sent to the collaborating or counterpart scatter network node. This information may provide a useful purpose, in addition to the conventional function of a heartbeat message to indicate the sending logical communication channel remains in operation. Other information may be sent in the data portion of the heartbeat messages. For example, an indication of counts of messages sent on the subject logical communication channel as well as other logical communication channels to the counterpart scatter network node may be encoded in a bit map in the data portion of the heartbeat messages. Thus, the counterpart scatter network node can use the information about counts of messages sent by the scatter network node sending the heartbeat to analyze messages received by the counterpart scatter network node on the various logical communication channels to evaluate whether messages are getting lost in transit or not.

In an embodiment, the communication between two scatter network nodes may route through relays. For example, the first logical communication channel between the first scatter network node and the second scatter network node described above may comprise two communication links: a first communication link between the third IP address and a seventh IP address associated with a relay, and a second communication link between an eighth IP address associated with the relay and the fourth IP address. Use of such a relay can act to further obfuscate the communication path and thwart an eavesdropper attempting to understand and glean information from the communication between the first scatter network node and the second scatter network node. It is understood that the first communication link between the third IP address and the seventh IP address may pass through any number of router nodes. It is understood that the second communication link between the eighth IP address and the fourth IP address may pass through any number of router nodes.

In an embodiment, the communication between two scatter network nodes may route through one or more tiers of advanced relays. In an embodiment, an advanced relay or a smart relay may provide some of the functionality of a scatter network node in that it can parse a data packet to isolate a scattering application datagram and parse the scattering application datagram to obtain an identity token in the header of the scattering application datagram and differentially transmit the received scattering application datagrams to different IP address and transport layer port number pairs at a receiving scatter network node based on the scattering application datagrams carrying different identity tokens. The use of such advanced relays can further confuse would-be eavesdroppers and complicate the flow path of messages between an actual source user device and an actual destination user device.

In an embodiment, a scatter network node may communicate with a plurality of other scatter network nodes at the same time. For example, a first scatter network node may establish a first plurality of logical communication channels with a second scatter network node; the first scatter network node may also establish a second plurality of logical communication channels with a third scatter network node, wherein none of the IP addresses of the first plurality of logical communication channels that are associated with the first scatter network node are the same as the IP addresses of the second plurality of logical communication channels that are associated with the first scatter network node. In another embodiment, however, at least one logical communication channel of the first plurality of logical communication channels has an IP address and port number associated with the first scatter network node that is the same as the IP address and port number associated with the first scatter network node of one of the second plurality of logical communication channels. In this case, the scattering application executing on the first scatter network node must distinguish between the incoming packets received from the second scatter network node on the common IP address and port number from the incoming packets received from the third scatter network node on the common IP address and port number.

In an embodiment, the data packets have an identifier in an application layer header (e.g., a header of a scattering application datagram) of the data packets that the scattering application on the first scatter network node can use to distinguish data packets received from the second scatter network node on the common IP address and port number from data packets received from the third scatter network node on the common IP address and port number. The identifier may be referred to as an identity token. The scattering application on the first scatter network node may look up a first decryption key or a first set of decryption keys stored in a non-transitory memory of the first scatter network node for decrypting data packets received from the second scatter network node on the common IP address and port number based on the identifier in the application layer header of the data packets received from the first scatter network node. The scattering application on the first scatter network node may look up a second decryption key or second set of decryption keys stored in the non-transitory memory of the first scatter network node for decrypting data packets received from the third scatter network node on the common IP address and port number based on the identifier in the application layer header of the data packets received from the third scatter network node.

Turning now to FIG. 1A, a communication system 10 is described. In an embodiment, the system 10 comprises a first scatter network node 12 that executes a first scattering application 13 and a second scatter network node 14 that executes a second scattering application 15. In an embodiment, the first scattering application 13 is a first instance and the second scattering application 15 is a second instance of the same scattering application. In another embodiment, however, the first scattering application 13 may be different from the second scattering application 15, for example the first scattering application 13 may be configured to play a client role while the second scattering application 15 may be configured to play a server role.

The scatter network node 12 and the scatter network node 14 may each be implemented as separate computer systems, for example server computers. Computer systems are described further hereinafter. One or both of the scatter network nodes 12, 14 may be implemented as a smart phone, a wearable computer, a headset computer, a laptop computer, a tablet computer, or a notebook computer. One of the scatter network nodes 12, 14 may be implemented as one or more virtual servers executing in a cloud computing environment.

The scattering applications 13, 15 comprise executable logic instructions that comprise scripts, compiled high-level language code, assembly language instructions, and/or interpreted language code. The scattering applications 13, 15 may be provided as shell scripts, complied C language code, compiled C++ language code, JAVA code, and/or some other kind of logic instructions. In an embodiment, compiled C language code is used to implement the logic instructions of the scattering applications 13, 15 and provides access to powerful operating system calls and greater control of the operations on the scatter network nodes 12, 14 than scripts may provide. The scattering applications 13, 15 may also comprise data such as configuration data and/or provisioning data, for example provisioning data that defines logical communication channels and associations of user devices to logical communication channels.

In an embodiment, the scatter network nodes 12, 14 collaborate with each other to establish a plurality of logical communication channels 16 by which they communicate with each other via a network 18. The network 18 may comprise one or more private networks, one or more public networks, or a combination thereof. In an embodiment, the network 18 comprises the Internet. FIG. 1 shows a first logical communication channel 16a, a second logical communication channel 16b, and a third logical communication channel 16c, but it is understood that the scatter network nodes 12, 14 may establish any number of logical communication channels 16, for example 2, 3, 4, 5, 6, 7, 8, 9, 10, 15, 16, 20, 25, 27, 30, 32, 64, 138, 256, 1024, 4096, or some other number of logical communication channels 16 less than 2 million logical communication channels.

Each logical communication channel 16 may comprise a data communication link that may be considered as an IP communication path. Each logical communication channel 16 is bidirectional: data packets may flow from the first scatter network node 12 to the second scatter network node 14 via the logical communication channels 16; and data packets may flow from the second scatter network node 14 to the first scatter network node 12 via the logical communication channels 16. Each logical communication channel 16 may pass through various network nodes within the network 18. As discussed further hereinafter, some of the network nodes that the logical communication channels 16 pass through may include simple scatter relays and/or advanced scatter relays. The data communication passing from the first scatter network node 12 to the second scatter network node 14 or vice versa from the second scatter network node 14 to the first scatter network node 12 is treated within the network 18 as IP datagrams. In an embodiment, the communication between the first scatter network node 12 and the second scatter network node 14 is encrypted. For example, a data portion of an application datagram encapsulated in a data portion of the IP datagrams may be encrypted. For example, a data portion of an application datagram and selected parts of a header portion of the application datagram encapsulated in the data portion of the IP datagrams may be encrypted. In an embodiment, the communication between the first scatter network node 12 and the second scatter network node 14 may be considered to flow over a virtual private network (VPN). In some contexts, the scatter network nodes 12, 14 may be said to establish a scatter network via the logical communication channels 16.

A first communication user device 20 may establish a first local communication link 21 with the first scatter network node 12. A second communication user device 22 may establish a second local communication link 23 with the second scatter network node 14. The communication user devices 20, 22 may desire to communicate with each other via an application layer link 24 that is implemented via the scatter network nodes 12, 14 that provide network layer communication links (IP datagram traffic) via the network 18. Note that the dotted line 24 indicates that the application layer link is conceptual in nature and that the actual communication path between the communication user devices 20, 22 passes through the scatter network nodes 12, 14 and the network 18. The first and second local communication links may be insecure and may not carry encrypted data packets. For example, the IP datagrams sent by the first communication user device 20 may designate the true IP address of the first communication user device 20, and the IP datagrams sent by the second communication user device 22 may designate the true IP address of the second communication user device 22. It is undesirable to send IP datagrams that include the true IP addresses of communication user devices 20, 22 via the network 18 because an adversary system 26 may be sniffing or otherwise monitoring the data traffic in the network 18 and identify these user devices 20, 22. The scatter network nodes 12, 14 hide the true IP addresses of the communication user devices 20, 22.

Figure 1B:
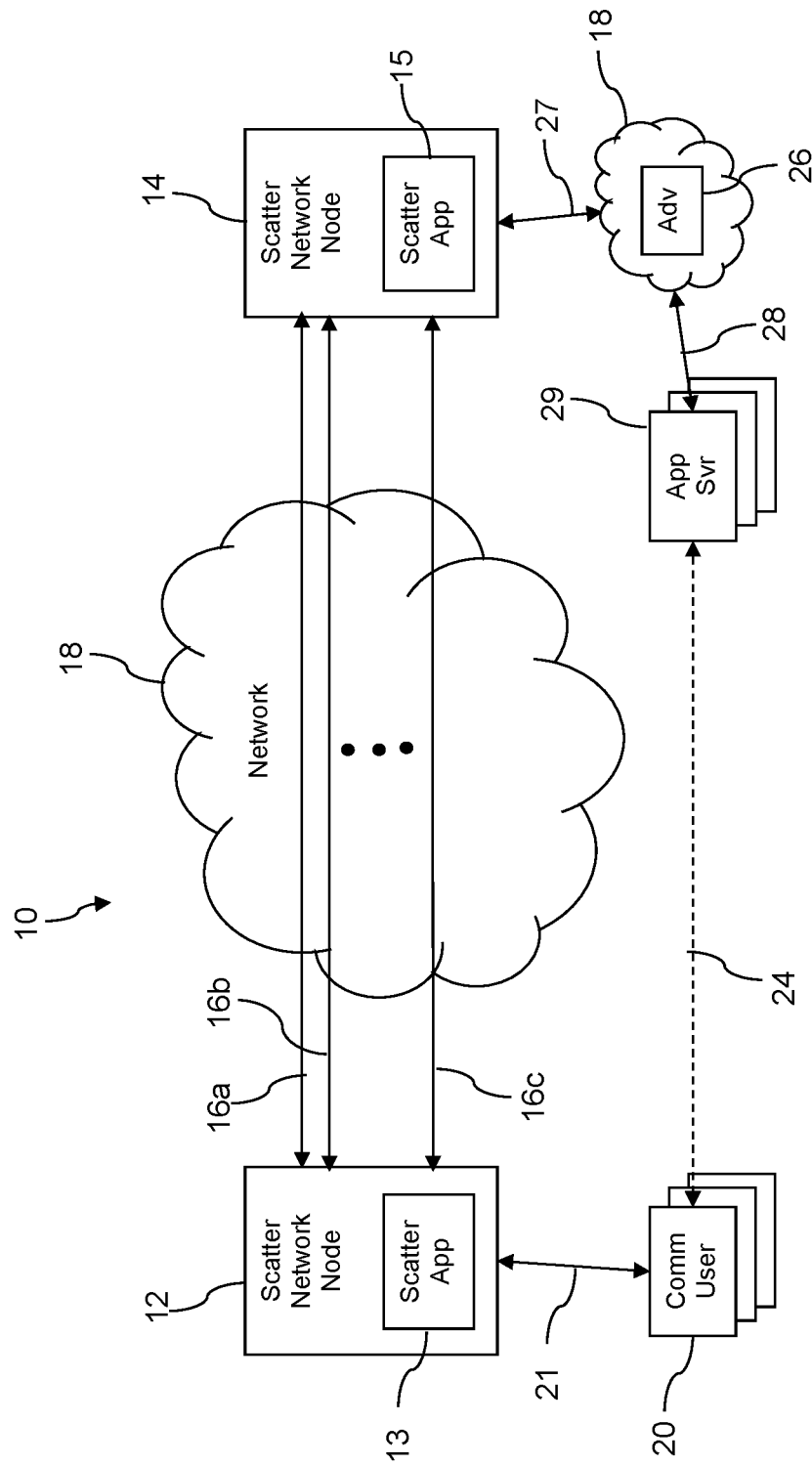
FIG. 1B is another block diagram of the communication system according to an embodiment of the disclosure.

Turning now to FIG. 1B, an alternate view of the communication system 10 is described. The communication functionality provided by the scatter network nodes 12, 14 is general and applies to other communication scenarios than that illustrated and described with reference to FIG. 1A. Note that the network 18 is shown as two cloud images in FIG. 1B but these two clouds conceptually refer to the same network. It is illustrated in FIG. 1B to facilitate understanding of flow of communications. In FIG. 1B, the communicating end users may be considered to be the first communication user device 20 and an application server 29. Thus, the first communication user device 20 may communicate with the application server 29 via an application layer communication link 24 that is conceptual in nature. The first communication user device 20 may request content from and receive content from the application server 29 or send content to the application server 29 conceptually over the application layer communication link 24 but in fact via the first communication link 21, via the logical communication channels 16, via a third communication link 27 to the network 18, and from the network 18 via a fourth communication link 28 to the application server 29. It will be appreciated that the network 18 through which the logical communication channels 16 route is the same network 18 through which the second scatter network node 14 communicates with the application server 29 via communication links 27, 28, drawn separately here to support further understanding of the system 10.

As illustrated in FIG. 1B, the adversary 26 may be located so as to monitor communication between the network 18 and the application server 29. The adversary 26 may determine the true IP addresses of a communication port of the second scatter network node 14 and a communication port of the application server 29. Importantly, however, the adversary 26 is not able to determine the true IP address of the first scatter network node 12 or of the first communication user device 20, hence the adversary 26 is not readily able to determine an approximate location of the first communication user device 20 and/or of the first scatter network node 12.

With reference now to both FIG. 1A and FIG. 1B, the first logical communication channel 16a may be considered to be defined by an IP address and port number at the first scatter network node 12 and an IP address and port number at the second scatter network node 14. The term port number or port numbers refers to a transport communication layer port number or transport communication layer port numbers and may include well-known port numbers. In an embodiment, the first scatter network node 12 and or the first scattering application 13 may define sockets to establish the communication ports at its end of the logical communication channels 16, and the second scatter network node 14 and/or the second scattering application 15 may define coordinate sockets to establish the communication ports at its end of the logical communication channels 16. Sockets are a well-known communication abstraction used for conducting data communication between computer systems over the Internet. In an embodiment, the sockets may be user datagram protocol (UDP) type sockets. In an embodiment, the sockets may be transmission control protocol (TCP) type sockets. In an embodiment, a different intermachine communication abstraction may be used to implement the logical communication channels 16.

The first logical communication channel 16a is bidirectional: in a first communication event, the first scatter network node 12 may send an IP datagram via the first logical communication channel 16a to the second scatter network node 14 via the network 18, while in a second communication event, the second scatter network node 14 may send an IP datagram via the first logical communication channel 16a to the first scatter network node 12 via the network 18. The different logical communication channels 16 connect to the first scatter network node 12 at a different pair of IP address port number values. For example, the first logical communication channel 16a may connect to the first scatter network node 12 at a first IP address and first port number; the second logical communication channel 16b may connect to the first scatter network node 12 at a second IP address and the first port number; and the third logical communication channel 16c may connect to the first scatter network node 12 at a third IP address and the first port number.

Alternatively, the first logical communication channel 16a may connect to the first scatter network node 12 at a first IP address and first port number; the second logical communication channel 16b may connect to the first scatter network node 12 at the first IP address and a second port number; and the third logical communication channel 16c may connect to the first scatter network node 12 at the first IP address and a third port number. Alternatively, the first logical communication channel 16a may connect to the first scatter network node 12 at a first IP address and first port number; the second logical communication channel 16b may connect to the first scatter network node 12 at a second IP address and the first port number; and the third logical communication channel 16c may connect to the first scatter network node 12 at a third IP address and a second port number. The logical communication channels 16 may attach to the second scatter network node 14 by other combinations of IP address/port number pairs.

It is noted that a logical communication channel 16 may be defined by any unique combination of (A) an IP address associated with the first scatter network node 12, (B) a port number at the first scatter network node 12, (C) an IP address associated with the second scatter network node, and (D) a port number at the second scatter network node. Thus, the first logical channel 16a could be defined by a first IP address associated with the first scatter network node 12, a first port number at the first scatter network node 12, a second IP address associated with the second scatter network node 14, and a second port number at the second scatter network node; the second logical channel 16b could be defined by the first IP address associated with the first scatter network node 12, the first port number at the first scatter network node 12, a third IP address associated with the second scatter network node 14, and the second port number at the second scatter network node; and the third logical channel 16c could be defined by the first IP address associated with the first scatter network node 12, the first port number at the first scatter network node 12, the second IP address associated with the second scatter network node 14, and a third port number at the second scatter network node. These are examples of unique IP addresses and port numbers that uniquely define logical communication channels 16, but it is understood there are many alternative combinations.

Figure 2:
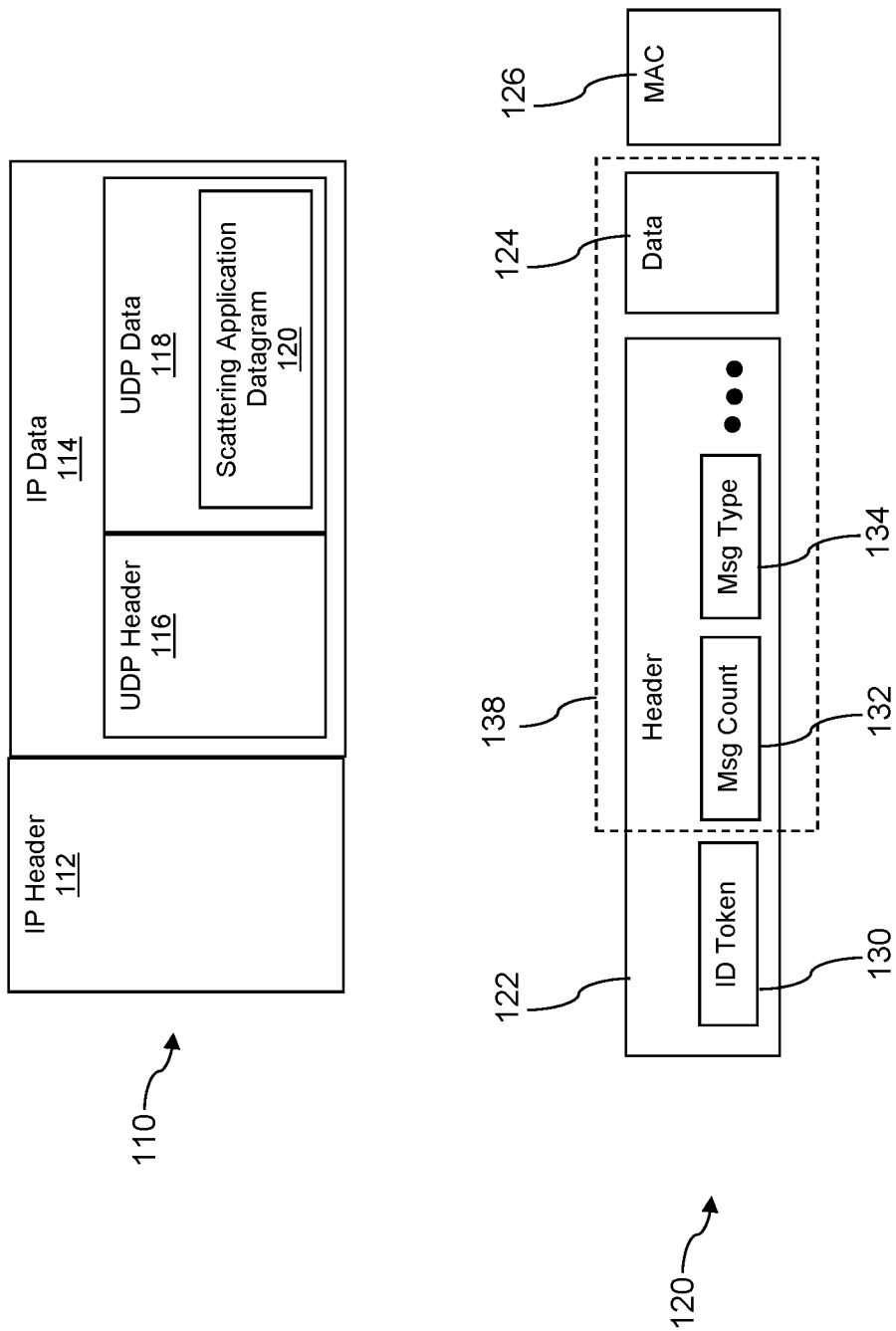
FIG. 2 is a block diagram of a scattering application datagram according to an embodiment of the disclosure.

Turning now to FIG. 2, a scattering application datagram 120 is described. In an embodiment, the messages exchanged by counterpart scatter network nodes 12, 14 each comprise a scattering application datagram 120. In an embodiment, the scattering application datagram 120 is encapsulated as a UDP data portion 118 of a UDP datagram that also comprises a UDP header 116. The UDP datagram itself is encapsulated in an IP data portion 114 of an IP datagram 110 that also comprises an IP header 112. In another embodiment, the scattering application datagram 120 may be encapsulated in a TCP data portion in a TCP datagram, and the TCP datagram may be encapsulated in the IP data portion 114 of the IP datagram 110.

In an embodiment, the scattering application datagram 120 comprises a scattering application datagram header 122, a scattering application datagram data portion 124, and a scattering application datagram message authentication code (MAC) 126. Note that the scattering application datagram data portion 124 may be called the scattering application datagram payload, that the UDP data portion 118 may be called the UDP payload, and the IP data portion 114 may be referred to as the IP payload in some contexts. In like manner, a TCP data portion may be referred to as a TCP payload in an embodiment where the TCP transport layer protocol is used instead of the UDP transport layer protocol. In an embodiment, the scattering application datagram header 122 comprises an identity token 130, a message count 132, and a message type 134. It is understood that the scattering application datagram header 122 may comprise additional parameters, for example parameters that contain metadata about the scattering application datagram 120 or the logical communication channels 16.

The scattering application datagram data portion 124 comprises the actual data content that is to be conveyed between the communication user devices 20, 22 or between the first communication user device 20 and the application server 29. In an embodiment, a portion of the scattering application datagram header 122 and all of the scattering application datagram data are encrypted in an encrypted portion 138. In an embodiment, the message count 132 and the message type 134 parameters of the scattering application datagram header 122 as well as the scattering application datagram data portion 124 are encrypted. It is understood that the positional order of parameters in the scattering application header 122 may be different in different embodiments, although it may be preferred that the identity token 130 be at the front of the scattering application datagram header 122, separate from the encrypted portion 138 of the scattering application datagram 120.

The identity token 130 uniquely identifies the scattering network node 12, 14 that sends a given scattering application datagram 120 on a logical communication channel 16. The identity token 130 permits the counterpart scattering network node to look-up an appropriate decryption key stored in a non-transitory memory of the counterpart scattering network node and decrypt the encrypted portion 138. The scattering application datagram MAC 126 provides a cryptographic checksum that can be used by the counterpart scattering network node to determine if the scattering application datagram 120 has been altered. The scattering application datagram MAC 126 may be calculated as a kind of hash or checksum calculated over the encrypted portion 138 based in part on using the selected encryption key. If the scattering application datagram MAC 126 does not match the MAC calculated by the scattering application 13, 15, the entire scattering application datagram 120 may be discarded as corrupted. In this case, the scattering application 13, 15 does not decrypt the encrypted portion 138. The scattering application datagram MAC 126 may be at least 6 bytes long, at least 8 bytes long, at least 10 bytes long, at least 12 bytes long, at least 14 bytes long, at least 16 bytes long, at least 18 bytes long, at least 20 bytes long, at least 22 bytes long, at least 24 bytes long and less than 129 bytes long.

The message count 132 is a count of scattering application datagrams 120 sent by a scatter network node 12, 14 to a given counterpart scatter network node. The scattering application 13, 15 may keep a local count value as it sends scattering application datagrams 120 and build this into the message count 132. In an embodiment, the message count 132 may be 4 bytes, 5 bytes, 6 bytes, 7 bytes, 8 bytes, 9 bytes, 10 bytes, 12 bytes, or some other number of bytes less than 24 bytes. As discussed further herein after, the receiving scattering application 13, 15 may use the message count to reorder received messages carried in the data portion 124 of the scattering application datagram 120 before forwarding on to the communication user device 20, 22 or to the application server 29. The message type 134 may indicate a type of the message carried in the data portion 124 of the scattering application datagram 120. The message type 134 may indicate that the message is a heartbeat message, is an encryption key rotate command, is a data message (e.g., data relevant to the communication user devices 20, 22 or to the application server 29), or some other type of message.

When the first communication user device 20 sends a data message to the second communication user device 22, the first scattering application 13 may segment this data message into a plurality of different IP datagrams. The first scattering application 13 sends at least some of the different IP datagram derived from the data message via different ones of the logical communication channels 16. It will be appreciated that if a data message is segmented into a greater number of IP datagrams than the total number of available logical communication channels 16, some of the IP datagrams may be sent over the same logical communication channels 16. The first scattering application 13 may select logical communication channels 16 for sending different IP datagrams to the second scatter network node 14 according to a randomizing selection process. In this way, the adversary system 26 is confronted with a kaleidoscope of unrelated IP datagrams associated with different IP address/port number associations that make it difficult or impossible to associate these IP datagrams to a single data message passing from the first communication user device 20 to the second communication user device 22 via the conceptual application layer link 24. In a like manner, when the second communication user device 22 sends a data message to the first communication user device 20, the second scattering application 15 may segment this data message into a plurality of different IP datagrams and send different ones of these IP datagrams via different logical communication channels 16 selected in a randomizing selection process.

The scattering applications 13, 15 are preconfigured to associate traffic on the logical communication channels 16 with the communication user devices 20, 22. For example, the first scattering application 13 is preconfigured to associate IP datagrams received on logical communication channels 16 to the first communication user device 20 (e.g., to the true IP address of the first communication user device 20) and to associate IP datagrams addressed to the true IP address of the second communication user device 22 to the logical communication channels 16. For example, the second scattering application 15 is preconfigured to associate IP datagrams received on the logical communication channels 16 to the second communication user device 22 (e.g., to the true IP address of the second communication user device 22) and to associate IP datagrams addressed to the true IP address of the first communication user device 20 to the logical communication channels 16. In other words, the communication user devices 20, 22 communicate in terms of their own true IP addresses, but the scatter network nodes 12, 14 hide these true IP addresses from the network 18 by means of the logical communication channels 16 which do not use the true IP addresses of the communication user devices 20, 22.

The first scatter network node 12 and the second scatter network node 14 may provide a plurality of different physical interfaces which are used to implement the logical communication channels 16. These different physical interfaces may comprise one or more Ethernet physical interfaces, one or more wireless local area network (WLAN) physical interfaces, and one or more wireless wide area network (WWAN) physical interfaces, one or more satellite communication physical interfaces. The WLAN physical interfaces may comprise a WiFi physical interface and/or a Bluetooth physical interface. The WWAN physical interfaces may comprise a 6G wireless telecommunication protocol physical interface, a 5G wireless telecommunication protocol physical interface, a long-term evolution (LTE) wireless telecommunication protocol physical interface, a code division multiple access (CDMA) wireless telecommunication protocol physical interface, and/or a global system for mobile communication (GSM) wireless telecommunication protocol physical interface. Different physical interfaces may include Internet Protocol 6 Over Low-Power Wireless Personal Area Networks (6LoWPAN), Bluetooth, Bluetooth Low Energy (BLE), global system for mobile communications (GSM), LoRa, LTE, LTE-M, LTE-MTC, Narrowband IoT (NB-IOT), near field communication (NFC), WiFi Direct, Z-Wave, and/or Zigbee wireless physical interfaces. The satellite communication physical interface may comprise an Ethernet-to-satellite physical interface (e.g., a dongle device that uses an Ethernet connector to couple to a computer system and acts as a satellite wireless base station). The physical interfaces provided by the first scatter network node 12 may be different from the physical interfaces provided by the second scatter network node 14. By employing different physical interfaces to implement the logical communication channels 16, channel diversity may be increased and may help to further thwart attempts by the adversary system 26 to eavesdrop or monitor communications between the communication user devices 20, 22.

In an embodiment, both the first scattering application 13 and the second scattering application 15 send heartbeat messages over the logical communication channels 16, when a logical communication channel has been idle for a first predefined period of time. More specifically, the first scattering application 13 maintains a different transmit idle timer for each one of the logical communication channels 16. When the first scattering application 13 sends a data packet out to the second scattering network node 14 on a given logical communication channel 16, the first scattering application 13 resets the transmit idle timer associated with that logical communication channel 16 to zero and then begins accumulating time on that transmit idle timer again starting from a zero value. When any transmit idle timer maintained by the first scattering application 13 exceeds the first predefined period of time, the first scattering application 13 sends a heartbeat data packet via the subject logical communication channel 16 to the second scattering network node 14 and resets the associated transmit idle timer to a zero value, whereby the second scattering network node 14 can be assured that the subject logical communication channel 16 is still operable.

Likewise, the second scattering application 15 maintains a different transmit idle timer for each one of the logical communication channels 16. When the second scattering application 15 sends a data packet out to the first scattering network node 12 on a given logical communication channel 16, the second scattering application 15 resets the transmit idle timer associated with that logical communication channel 16 to zero and then begins accumulating time on that transmit idle timer again starting from a zero value. When any transmit idle timer maintained by the second scattering application 15 exceeds the first predefined period of time, the second scattering application 15 sends a heartbeat data packet via the subject logical communication channel 16 to the first scattering network node 12 and resets the associated transmit idle timer to zero, whereby the first scattering network node 12 can be assured that the subject logical communication channel 16 is still operable. In an embodiment, the first predefined period of time may be 5 seconds, 10 second, 15 seconds, or some other period of time less than 120 seconds. In an embodiment the first scattering application 13 and the second scattering application 15 may be configured with different first predefined period of time values.

The first scattering application 13 maintains a different receive idle timer for each of the logical communication channels 16. When the first scattering application 13 receives a data packet (either a normal data packet or a heartbeat data packet) on a given one of the logical communication channels 16, it resets the associated receive idle timer to a zero value and begins accumulating time in the subject receive idle timer again from zero. When a receive idle timer maintained by the first scattering application 13 exceeds a second predefined time interval, the first scattering application 13 marks the associated logical communication channel 16 as invalid or inoperable. When randomly selecting logical communication channels 16 for transmitting data packets to the second scatter network node 14, the first scattering application 13 will pass over any logical communication channels 16 that it has marked as invalid or inoperable. The first scattering application 13 may occasionally and/or periodically attempt to reestablish the logical communication channels 16 that it has marked as invalid or inoperable.

The second scattering application 15 maintains a different receive idle timer for each of the logical communication channels 16. When the second scattering application 15 receives a data packet (either a normal data packet or a heartbeat data packet) on a given one of the logical communication channels 16, it resets the associated receive idle timer to a zero value and begins accumulating time in the subject receive idle timer again from zero. When a receive idle timer maintained by the second scattering application 15 exceeds the second predefined time interval, the second scattering application 15 marks the associated logical communication channel 16 as invalid or inoperable. When randomly selecting logical communication channels 16 for transmitting data packets to the first scatter network node 12, the second scattering application 15 will pass over any logical communication channels 16 that it has marked as invalid or inoperable. The second scattering application 15 may occasionally and/or periodically attempt to reestablish the logical communication channels 16 that it has marked as invalid or inoperable. The second predefined period of time value is greater than the first predefined period of time value. In an embodiment, the second predefined period of time may be 20 seconds, 30 second, 45 seconds, or some other period of time less than 300 seconds. In an embodiment the first scattering application 13 and the second scattering application 15 may be configured with different second predefined period of time values.

In an embodiment, the heartbeat data packets sent by the scattering applications 13, 15 comprise scattering application datagrams 120 whose data portions 124 are encrypted. In an embodiment, the data portion 124 of the scattering application datagrams 120 which contain heartbeat messages contain at least 5 bytes of data, at least 10 bytes of data, at least 25 bytes of data, at least 100 bytes of data, at least 200 bytes of data, at least 500 bytes of data or some other number of bytes of data less than 2000 bytes of data. In an embodiment, the data portion 124 of scattering application datagrams 120 which contain heartbeat messages may comprise a bit map indicating messages sent on each of the logical communication channels 16, not just the specific logical communication channel 16 associated with the given heartbeat data packet. The bit map may indicate message counts for each logical communication channel 16, whereby the scattering application 13, 15 receiving and analyzing the subject heartbeat message can determine the status of communication on the logical communication channels 16. In an embodiment, the data portion 124 of scattering application datagrams 120 which contain heartbeat messages may comprise information on the performance of the logical communication channels 16.

In an embodiment, the scattering applications 13, 15 provide virtual private network (VPN) communication functionality over the logical communication channels 16. Unlike some VPN off-the-shelf tools, the VPN communication functionality provided by the scattering applications 13, 15 does not indicate the functionality in their headers. For example, some off-the-shelf VPN tools provide an indication in their headers that a message may be a set-up type of VPN data packet, a key exchange type of VPN data packet, and user data type of VPN data packets. It is undesirable to "tip the hand" of the VPN communication traffic, as this may give an advantage to the adversary system 26, for example allowing them to focus their effort on trying to extract encryption keys from the key exchange type of VPN data packets.

In an embodiment, the scattering applications 13, 15 are able to cache data packets received from the logical communication channels 16 and send them to the communication user devices 20, 22 and/or to the application server 29 in a preferred order. For example, a message sent by the first communication user device 20 via the application layer link 24 may be segmented into five IP datagrams by the scatter network node 12: packet 1, packet 2, packet 3, packet 4, and packet 5. The sequence number of these packets is indicated in message count 132 parameter of the header 122 of the scattering application datagram 120. The scatter network node 12 may send packet 1 on the second logical communication channel 16b, send packet 2 on the first logical communication channel 16a, send packet 3 on the first logical communication channel 16a, send packet 4 on the third logical communication channel 16c, and send packet 5 on the first logical communication channel 16a. These five IP datagrams may be received by the second scatter network node 14 in the order packet 2, packet 4, packet 1, packet 5, and packet 3. The second scattering application 15 may attempt to reorder the received packets in order of packet 1, packet 2, packet 3, packet 4, packet 5 based on the message count 132 in the header 122 of the scattering application datagrams 120 to make reassembling the five data packets into the message originally sent by the first communication user device 20 easier for the second communication user device 22 and/or application server 29. Likewise, the first scattering application 13 may attempt to reorder data packets sent to the first communication user device 20 in their original order.

In an embodiment, the scattering applications 13, 15 place received data packets associated with the same original message into a kind of cache or queue. As additional data packets associated with the same original message are received, the scattering applications 13, 15 keep track of a timestamp of arrival for each received IP datagram and the sequence of data packets. In an embodiment, a doubly linked list may be used to perform these functions. A doubly linked list can be traversed from either end of the linked list: traversed from the head of the doubly linked list to the tail of the doubly linked list or from the tail of the doubly linked list to the head of the doubly linked list. Each of the entries in the doubly linked list includes pointers or indexes to the preceding entry in the doubly linked list (the first entry points to the head of the doubly linked list and not to a preceding entry) and to a succeeding entry in the doubly linked list (the last entry points to the tail of the doubly linked list and not a succeeding entry). Each of the entries in the doubly linked list include a data packet. A different doubly linked list may be established for different scatter network nodes that a given scatter network node may receive data packets from (e.g., as described with reference to FIG. 4 hereinafter). The data packets may be the data portions 124 of the scattering application datagrams 120.

When a new data packet associated with the message associated with a doubly linked list is received, it is added to the end of the doubly linked list. The scattering application 13, 15 keeps track of the next expected data packet. For example, if a packet having message count 5001 is received, the next expected data packet in a sequence is packet 5002. If a packet 5003 is received but neither packet 5002 or packet 5001 has been received, the next expected packet is packet 5001. If packet 5001 is received and then packet 5003 is received, the next expected packet is packet 5002. When a next expected packet is received by the scattering application 13, 15, it immediately sends it on to the appropriate communication user device 20, 22. For example, the scattering application 13 sends such a next expected packet to the first communication user device 20, and the scattering application 15 sends such a next expected packet to the second communication user device 22. When a next expected packet is received, a new next expected packet is determined, and the doubly linked list is traversed to see if this new next expected packet is already queued in the doubly linked list. If this new next expected packet is queued in the doubly linked list, this packet is sent to the appropriate communication user device 20, 22. Yet another new next expected packet is determined and the doubly linked list is traversed yet again to determine if the current next expected packet is queued, and if so it is sent. It will be appreciated that the process of traversing the doubly linked list to discover if packets are ready to be sent can be coded in such a way that the doubly linked list is only traversed once. The scattering applications 13, 15 can keep track of when data packets queued in the doubly linked list are ready to expire and can send these on to the appropriate communication user device 20, 22, before they in fact expire, without waiting for the desired preceding packet to be received. In an embodiment, queued data packets with less than 1 second time remaining until expiration may be transmitted immediately. In an embodiment, queued data packets with time remaining of less than 500 ms may be transmitted immediately. In an embodiment, queued data packets with time remaining of less than 200 ms may be transmitted immediately. In an embodiment, queued data packets with a time remaining of less than 100 ms may be transmitted immediately.

Figure 3A:
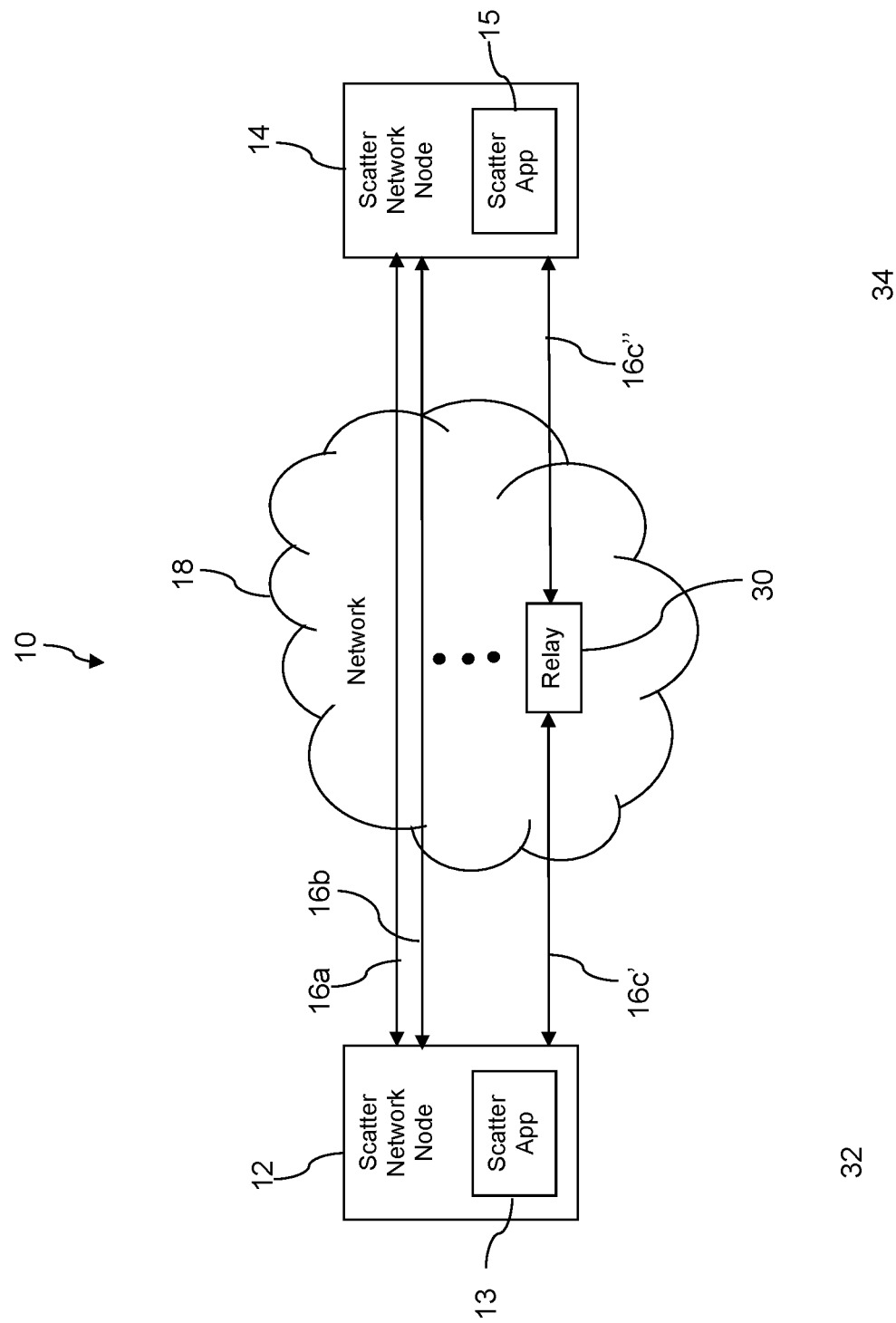
FIG. 3A is a block diagram of the communication system comprising a relay according to an embodiment of the disclosure.

Turning now to FIG. 3A, an embodiment of the communication system 10 is described. It is understood that elements illustrated FIG. 1A and/or FIG. 1B may be present in the communication system 10 of FIG. 3A but simply are not illustrated to avoid visual congestion. In an embodiment, the third logical communication channel 16c may comprise a fourth logical communication channel 16c' between the first scatter network node 12 and a relay 30 and a fifth logical communication channel 16c" between the relay 30 and the second scatter network node 14. The relay 30 may receive IP datagrams from and transmit IP datagrams to the fourth logical communication channel 16c' via a first IP address and port number pair. The relay 30 may receive IP datagrams from and transmit IP datagrams to the fifth logical communication channel 16c" via a second IP address and port number pair. The relay 30 merely passes IP datagrams through from the fourth logical communication channel 16c' to the fifth logical communication channel 16c" and from the fifth logical communication channel 16c" to the fourth logical communication channel 16c'. In some contexts, the relay 30 may be referred to as a simple scatter relay.

Figure 3B:
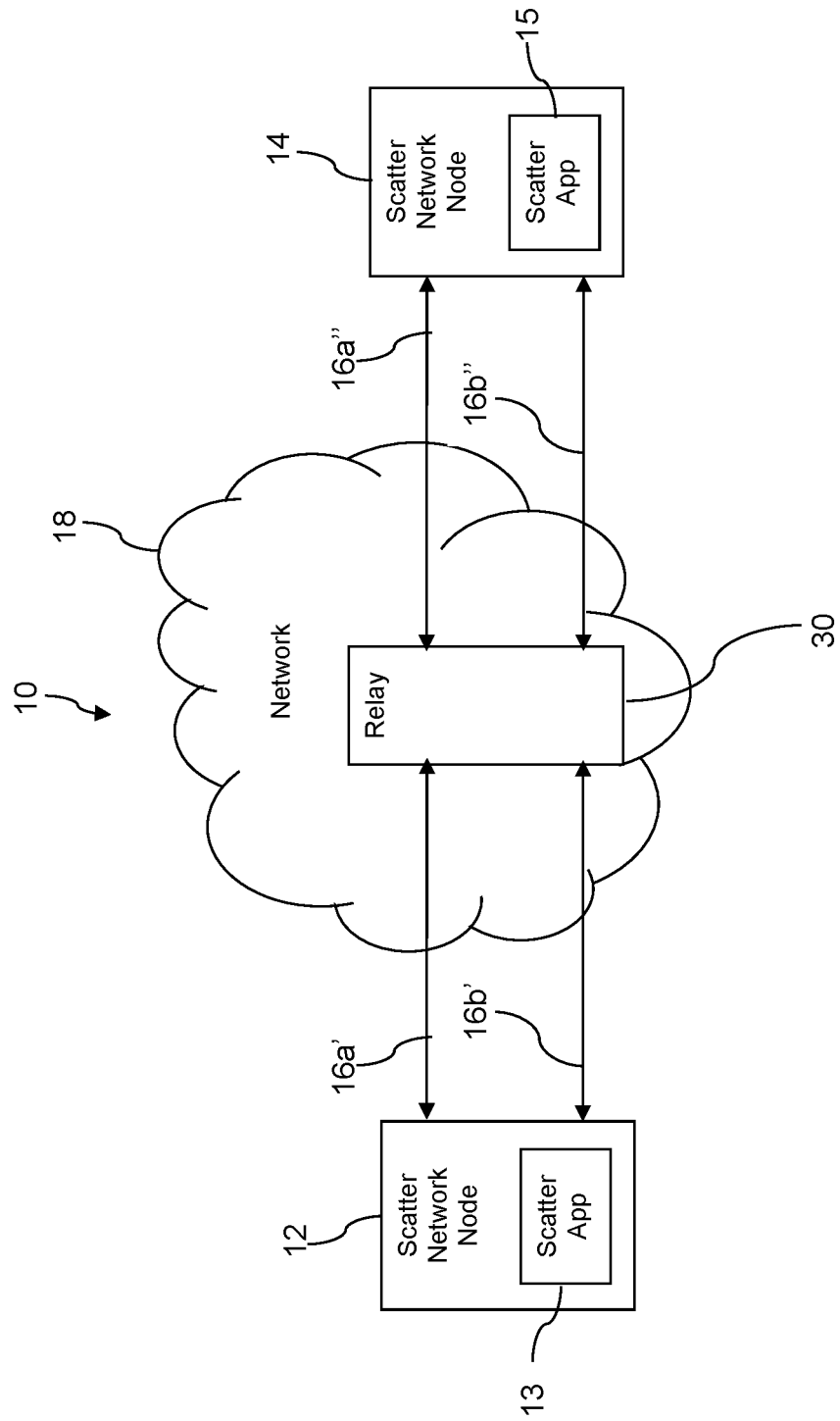
FIG. 3B is a block diagram of the communication system comprising a relay according to another embodiment of the disclosure.

Turning now to FIG. 3B, another embodiment of the communication system 10 is described. It is understood that elements illustrated FIG. 1A and/or FIG. 1B may be present in the communication system 10 of FIG. 3B but simply are not illustrated to avoid visual congestion. In an embodiment, the first logical communication channel 16a may comprise a sixth logical communication channel 16a' between the first scatter network node 12 and the relay 30 and a seventh logical communication channel 16a" between the relay 30 and the second scatter network node 14. In an embodiment, the second logical communication channel 16b may comprise an eighth logical communication channel 16b' between the first scatter network node 12 and the relay 30 and a ninth logical communication channel 16b" between the relay 30 and the second scatter network node 14. As with the relay 30 in FIG. 3A, the relay 30 of FIG. 3B merely passes IP datagrams through from the sixth logical communication channel 16a' to the seventh logical communication channel 16a" and from the seventh logical communication channel 16a" to the sixth logical communication channel 16a' and passes IP datagrams through from the eighth logical communication channel 16b' to the ninth logical communication channel 16b" and from the ninth logical communication channel 16b" to the eighth logical communication channel 16b'.

Figure 3C:
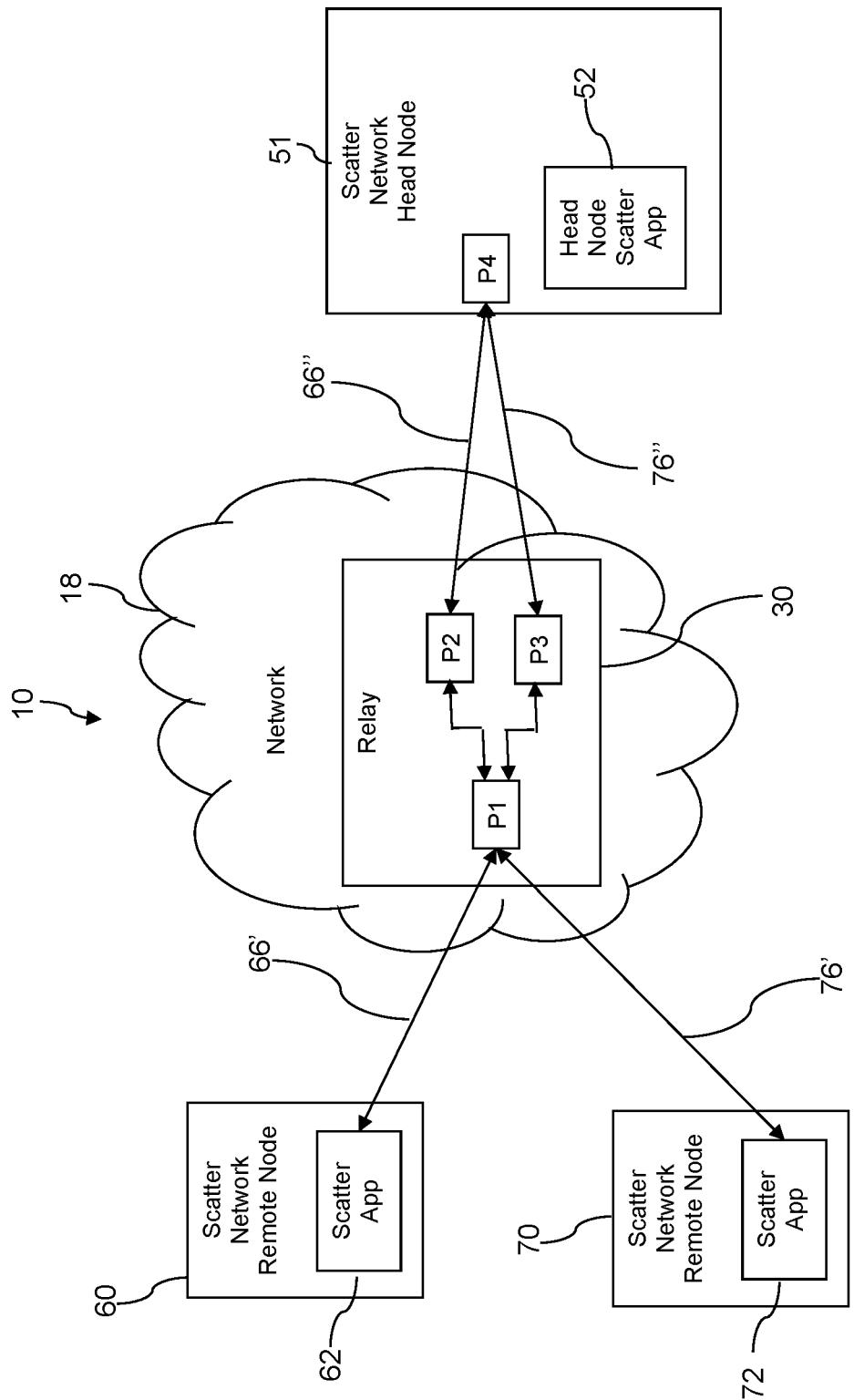
FIG. 3C is a block diagram of the communication system comprising a relay according to yet another embodiment of the disclosure.

Turning now to FIG. 3C, another embodiment of the communication system 10 is described. It is understood that elements illustrated FIG. 1A and/or FIG. 1B may be present in the communication system 10 of FIG. 3C but simply are not illustrated to avoid visual congestion. The system 10 in FIG. 3C comprises a first scatter network remote node 60 executing a scattering application 62, a second scatter network remote node 70 executing a scattering application 72, and a scatter network head node 51 that executes a head node scattering application 52. The scattering applications 62, 72 may be substantially similar to the scattering application 13, 15 described above. The head node scattering application 52 may be similar to the scattering applications 13, 15 described above but with some additional functionality described below with reference to FIG. 4. In particular, the head node scattering application 52 is able to provide a one server-to-multiple client scattering functionality based on the identity token 130 carried in the header 138 of the scattering application datagram 120.

The first scattering application establishes a tenth logical communication channel 66' defined by an IP address and port number at the first scatter network remote node 60 and an IP address and port number at the relay 30. The second scattering application establishes an eleventh logical communication channel 76' defined by an IP address and port number at the second scatter network remote node 70 and an IP address and port number at the relay 30. In an embodiment, the tenth logical communication channel 66' and the eleventh logical communication channel 76' both couple to the relay 30 at the same IP address and port number which are represented as port 1 (P!) in FIG. 3C.

The scatter network head node 51 establishes a twelfth logical communication channel 66" defined by an IP address and port number at the scatter network head node represented as port 4 (P4) and an IP address and port number at the relay 30 that is represented as port 2 (P2) in FIG. 3C. The scatter network head node 51 establishes a thirteenth logical communication channel 76" defined by the IP address and port number at the scatter network head node 51 represented as P4 and by an IP address and port number at the relay 30 that is represented as port 3 (P3) in FIG. 3C.

The relay 30 is able to selectively map IP datagrams received from the first scatter network remote node 60 on ninth logical communication channel 66' from P1 to P2 and onto tenth logical communication channel 66" to P4 at the scatter network head node 51. The relay 30 is able to selectively map IP datagrams received from the scatter network head node 51 on the tenth logical communication channel 66" from P2 to P1 and onto ninth logical communication channel 66' to the first scatter network remote node 60. The relay 30 is able to selectively map IP datagrams received from the second scatter network remote node 70 on eleventh logical communication channel 76' from P1 to P3 and onto twelfth logical communication channel 76" to P4 at the scatter network head node 51. The relay 30 is able to selectively map IP datagrams received from the scatter network head node 51 on the twelfth logical communication channel 76" from P3 to P1 and onto the eleventh logical communication channel 76' to the second scatter network remote node 70. As discussed further below with reference to FIG. 4, the head node scattering application 52 is able to distinguish scattering application datagrams 120 received from the first scatter network remote node 60 from scattering application datagrams 120 received from the second scatter network remote node 70 based on the different identity tokens 130 carried in the header 122 of the scattering application datagrams 120.

Figure 3D:
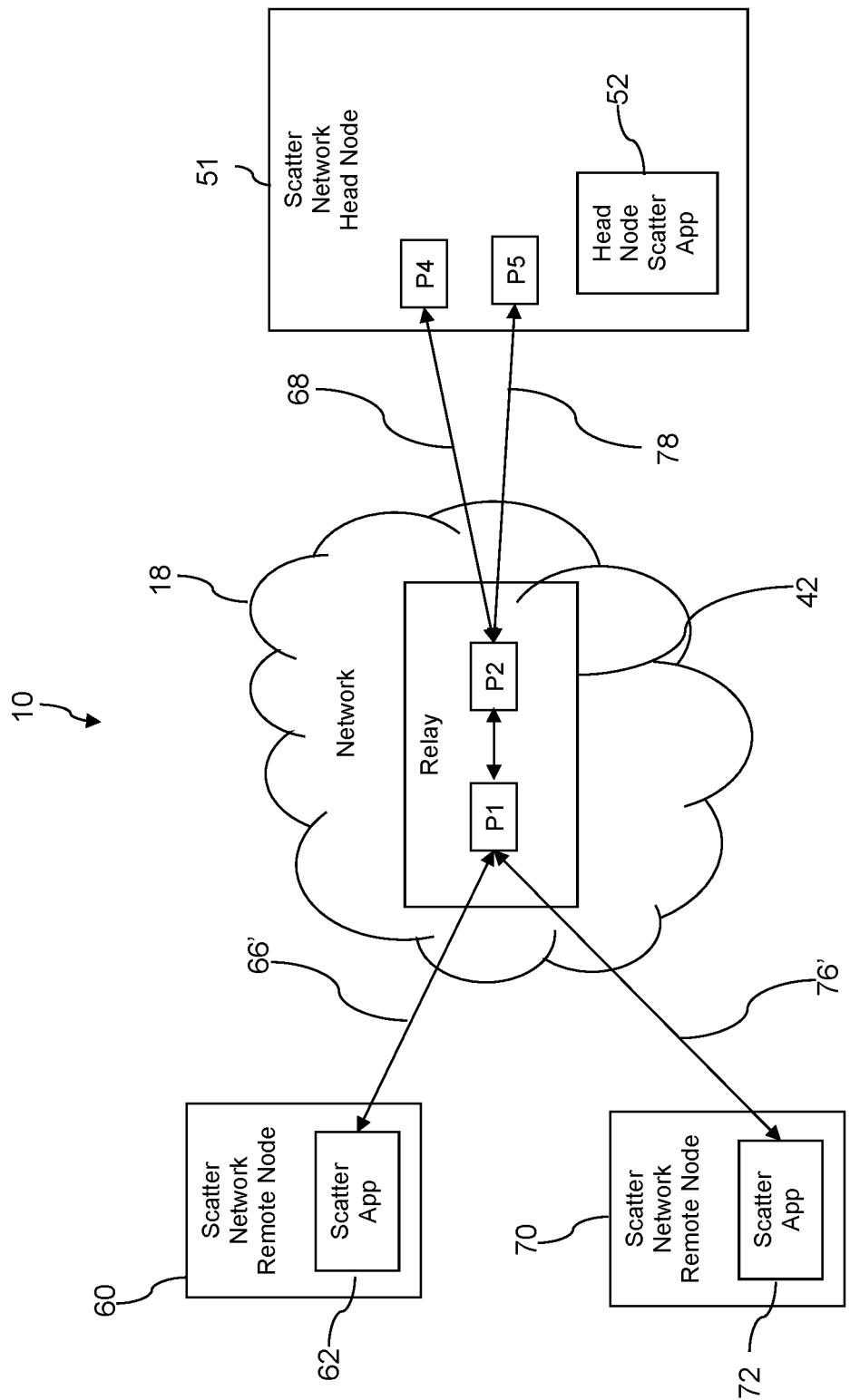
FIG. 3D is a block diagram of the communication system comprising an advanced relay according to an embodiment of the disclosure.

Turning now to FIG. 3D, an advanced relay 42 is described. Some aspects of the system 10 illustrated in FIG. 3D are like those described in FIG. 3C. In an embodiment, the advanced relay 42 is able to parse data messages to extract the identity token 130 of the header of the scattering application datagram 120 and send encapsulating IP datagrams to different end points based on the identity token 130. Thus, the advanced relay 42 provides some of the functionality of the head node scattering application 52 described further below with reference to FIG. 4. The scatter network head node 51 is able to establish a fourteenth logical communication channel 68 defined by an IP address and port number at the scatter network head node 51 that is represented as port 4 (P4) and an IP address and port number at the advanced relay 42 represented as port 2 (P2) in FIG. 3D. The scatter network head node 51 is able to establish a fifteenth logical communication channel 78 defined by an IP address and port number at the scatter network head node 51 that is represented as port 5 (P5) and the IP address and port number at the advanced relay represented as P2. In an embodiment, the advanced relay 42 may assign a P2 to act as an endpoint at the advanced relay 42 of the fourteenth logical communication channel 68 and a P3 to act as an endpoint at the advanced relay 42 of the fifteenth logical communication channel 78, in a manner similar to the relay 30 of FIG. 3C.

The advanced relay 42 receives a data message from the first scatter network node 60 on the ninth logical communication channel 66', parses the data message to read the identity token 130 encapsulated in the data message, and, based on the identity token 130 associating to the first scatter network remote node 60, sends the data message on the thirteenth logical communication channel 68 to the scatter network head node 51 on port P4. The advanced relay 42 receives a data message from the second scatter network node 70 on the tenth logical communication channel 76', parses the data message to read the identity token 130 encapsulated in the data message, and, based on the identity token 130 associating to the second scatter network remote node 70, sends the data message on the fourteenth logical communication channel 78 to the scatter network head node 51 on port P5. In like fashion, the advanced relay 42 receives a data message from the scatter network head node 51 on thirteenth logical communication channel 68 (or fourteenth logical communication channel 78), parses the data message, and, based on the identity token 130 being associated to the first scattering network remote node 60, sends the data message on the ninth logical communication channel 66' to the first scattering network remote node 60. In like fashion, the advanced relay 42 receives a data message from the scatter network head node 51 on the fourteenth logical communication channel 78 (or thirteenth logical communication channel 68), parses the data message, and, based on the identity token being associated to the second scattering network remote node 70, sends the data message on the tenth logical communication channel 76' to the second scattering network remote node 70.

Figure 4:
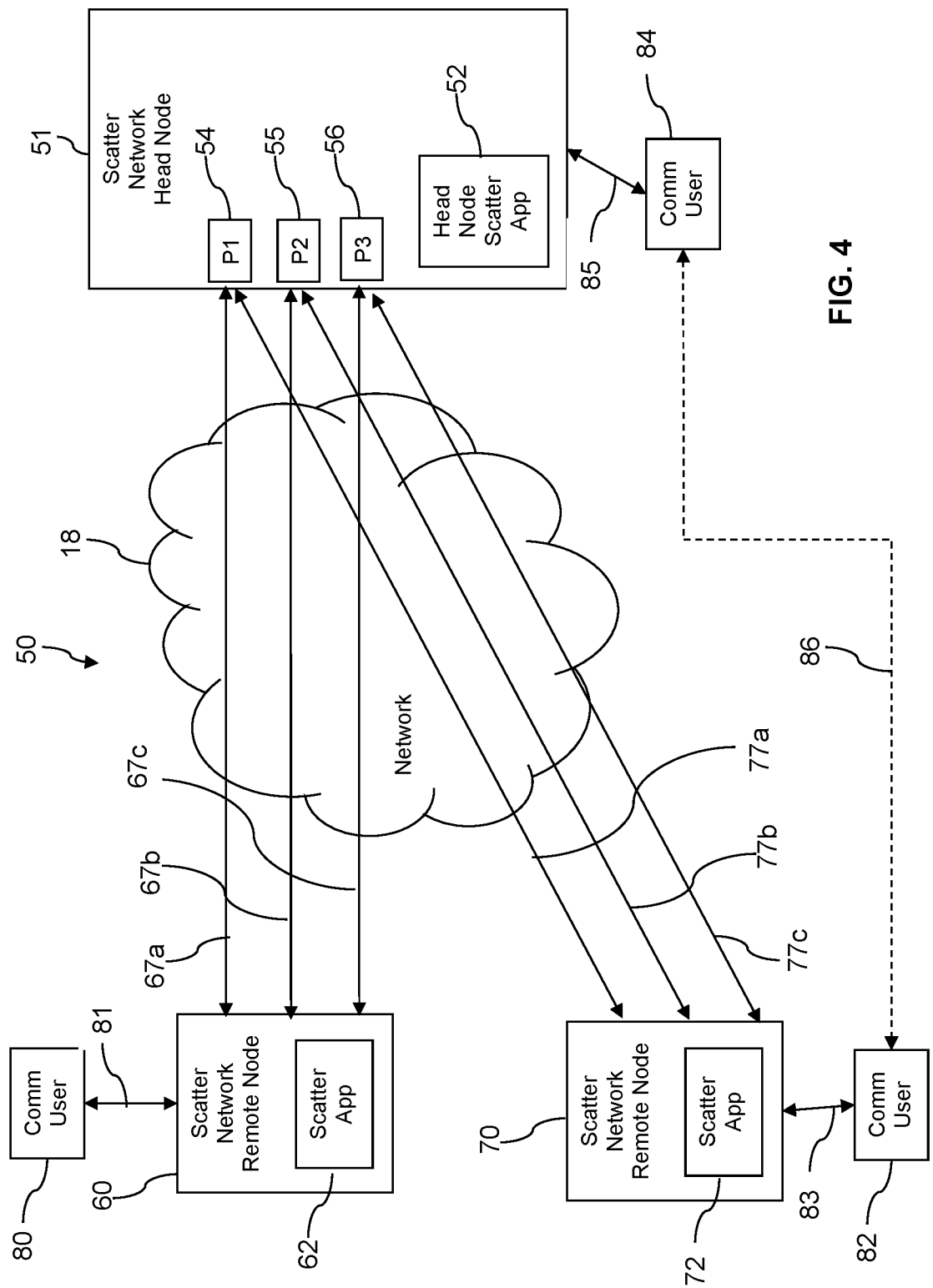
FIG. 4 is a block diagram of the communication system according to yet another embodiment of the disclosure.

Turning now to FIG. 4, a communication system 50 is described. The communication system 50 is similar to the communication system 10 described above, but the communication system 50 exhibits some differences. In communication system 50 a head scatter network node 51 may execute a head node scattering application 52 and support scatter communication via a first port number 54, a second port number 55, and a third port number 56. A first remote scatter network node 60 executing a scattering application 62 may establish a sixteenth logical communication channel 67*a* with the first port number 54 of the head scatter network node 51, a seventeenth logical communication channel 67*b* with the second port number 55, and an eighteenth logical communication channel 67*c* with the third port number 56. The port numbers 54, 55, 56 may be associated with the same or different IP addresses.

A second remote scatter network node 70 executing a scattering application 72 may establish a nineteenth logical communication channel 77*a* with the first port number 54, a twentieth logical communication channel 77*b* with the second port number 55, and a twenty-first logical channel 77*c* with the third port number 56. It is understood that the sixteenth logical communication channel 67*a* connects to the head scatter network node 51 at the same IP address/port number pair as the nineteenth logical communication channel 77*a*; that the seventeenth logical communication channel 67*b* connects to the head scatter network node 51 at the same IP address/port number pair as the twentieth logical communication channel 77*b*; and that the eighteenth logical communication channel 67*c* connects to the head scatter network node 51 at the same IP address/port number pair as the twenty-first logical communication channel 77*c*. It is understood that, in an embodiment, one or more of the logical communication channels 67*a*, 67*b*, 67*c*, 77*a*, 77*b*, 77*c* may have one or more relays 30 (e.g., simple relays) and/or one or more advanced relays 42.

In an embodiment, the remote scatter network nodes 60, 70 may be relatively low-capability devices such as smart phones, laptop computers, notebook computers, tablet computers, desktop computers or a mix of these. The head scatter network node 51, by contrast, may be a relatively high capability device such as a server computer or a plurality of server computers. In an embodiment, the head scatter network node 51 may be provided by one or more virtual servers executing in a cloud computing environment. In some contexts, the communication system 50 may be referred to as a one server-to-many clients scatter network configuration. In an embodiment, the remote scatter network nodes 60, 70 may be located in the field and the head scatter network node 51 may be located at a central site such as an organizational headquarters, regional headquarters, or corporate headquarters.

In an embodiment, a third communication user device 80 may establish a communication link 81 with the first remote scatter network node 60, a fourth communication user device 82 may establish a communication link 83 with the second remote scatter network node 70, and a fifth communication user device 84 may establish a communication link 84 with the head scatter network node 51. The third communication user device 80 may communicate with the fifth communication user device 84 via the first remote scatter network node 60 and the head scatter network node 51. The fourth communication user device 82 may communicate with the fifth communication user device 84 via the second remote scatter network node 60 and the head scatter network node 51. The third communication user device 80 may communicate with the fourth communication user device 82 via the first remote scatter network node 60, the head scatter network node 51, and the second remote scatter network node 70. An application layer link 86 is illustrated between the fourth communication user device 82 and the fifth communication user device 84 which it is understood is a virtual communication channel supported by the communication link 83, the logical communication channels 77, and the communication link 85 to form a complete actual communication pathway between communication user devices 82, 84. A like application layer link could be drawn between the third communication user device 80 and the fifth communication user device 84 and between the third communication user device 80 and the fourth communication user device 82, but these additional application layer links are omitted to avoid congesting FIG. 5.

Because the data packets received at the port numbers 54, 55, 56 by the head scatter network node 51 may be received from the first remote scatter network node 60 or from the second remote scatter network node 70, the head node scattering application 52 may employ a method to distinguish which remote node 60, 70 sent a given data packet. In an embodiment, the scattering applications 52, 62, 72 embed the identity token 130 in the header 122 of the scattering application datagram 120 that each sends. This identity token 130 is used by the receiving scattering application 52, 62, 72 to identify the sending scatter network node 51, 60, 70 and therefore select an appropriate decryption key to decode the subject content of the IP datagram.

Figure 5A:
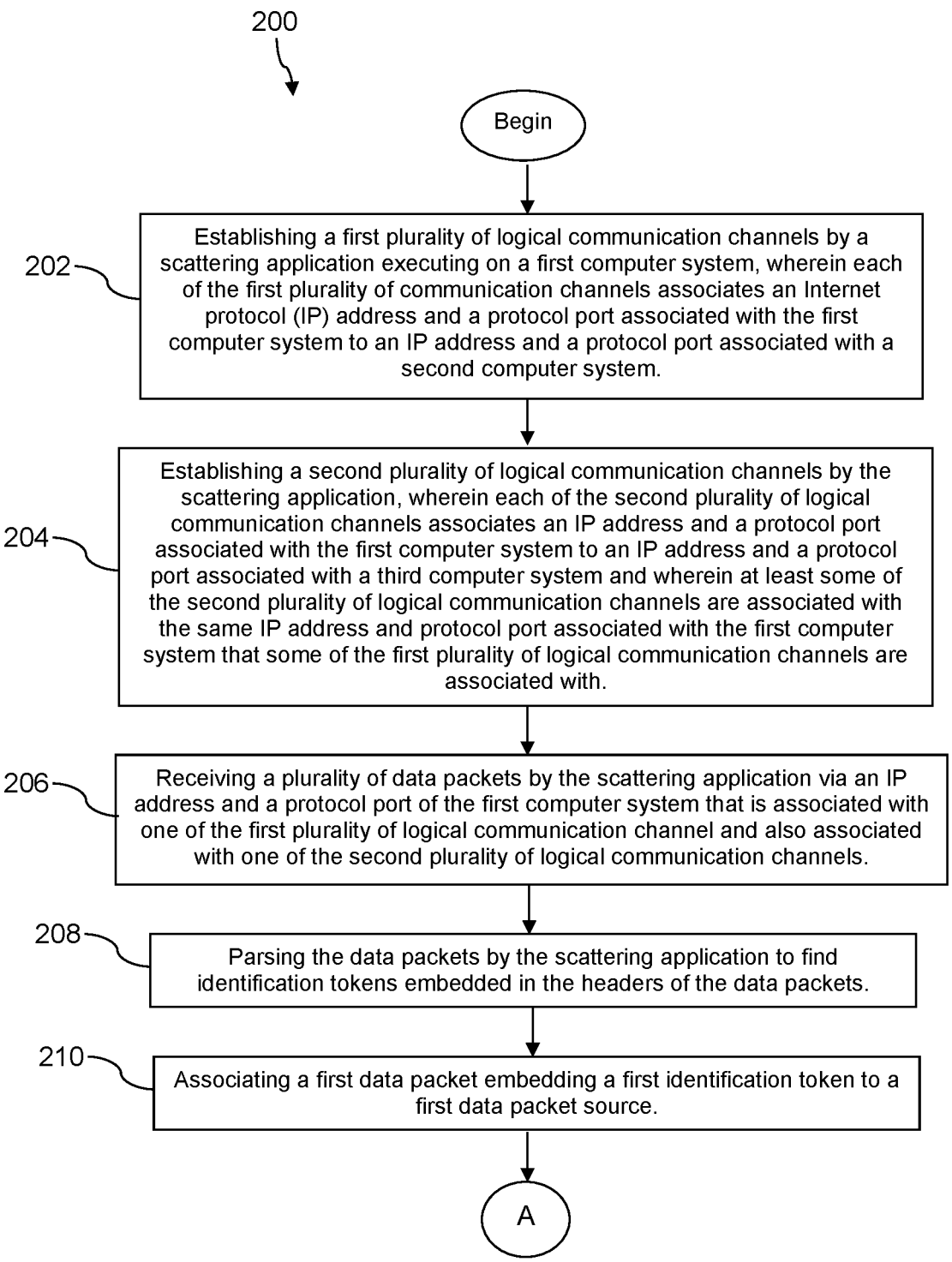
FIG. 5A and FIG. 5B is a flow chart of a method according to an embodiment of the disclosure.
Figure 5B:
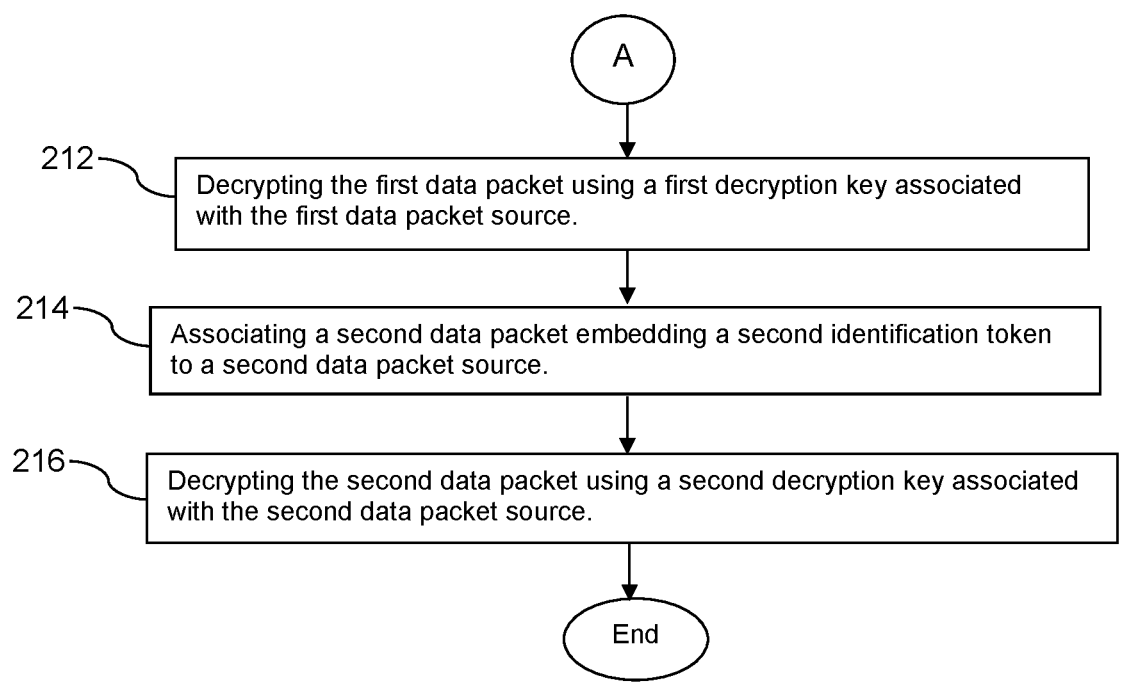

Turning now to FIG. 5A and FIG. 5B, a method 200 is described. In an embodiment, the method 200 is a method of secure data routing. At block 202, the method 200 comprises establishing a first plurality of logical communication channels by a scattering application executing on a first computer system, wherein each of the first plurality of communication channels associates an Internet protocol (IP) address and a protocol port associated with the first computer system to an IP address and a protocol port associated with a second computer system. In an embodiment, the first computer system is a virtual server. In an embodiment, the first computer system is a virtual server in a cloud computing environment. In an embodiment, the first computer system is a plurality of virtual servers in a cloud computing environment. In an embodiment, the first computer system is a server computer.

At block 204, the method 200 comprises establishing a second plurality of logical communication channels by the scattering application, wherein each of the second plurality of logical communication channels associates an IP address and a protocol port associated with the first computer system to an IP address and a protocol port associated with a third computer system and wherein at least some of the second plurality of logical communication channels are associated with the same IP address and protocol port associated with the first computer system that some of the first plurality of logical communication channels are associated with. At block 206, the method 200 comprises receiving a plurality of data packets by the scattering application via an IP address and a protocol port of the first computer system that is associated with one of the first plurality of logical communication channel and also associated with one of the second plurality of logical communication channels. In an embodiment, the data packets include a scattering application datagram. In an embodiment, the data packets include a UDP datagram that encapsulates a scattering application datagram in a data portion of the UDP packet. In an embodiment, the data packets include an IP datagram that encapsulates a UDP datagram in a data portion of the IP packet where the UDP datagram in turn encapsulates a scattering application datagram in a data portion of the UDP datagram.

At block 208, the method 200 comprises parsing the data packets by the scattering application to find identification tokens embedded in the headers of the data packets. In an embodiment, block 208 comprises parsing a scattering application header portion of scattering application datagrams to find the identification tokens. At block 210, the method 200 comprises associating a first data packet embedding a first identification token to a first data packet source.

At block 212, the method 200 comprises decrypting the first data packet using a first decryption key associated with the first data packet source. In an embodiment, the method 200 comprises first authenticating the first data packet before decrypting and, if the first data packet cannot be authenticated, the decrypting of block 212 is omitted and the first data packet is dropped or ignored. The process of authenticating the first data packet may comprise calculating a MAC by the scattering application over the header 122 and data portion 124 of the scattering application datagram 120 included in the data packet and comparing this calculated MAC to the MAC 126 appended to the end of the scattering application datagram 120. In an embodiment, decrypting the first data packet comprises decrypting a portion of a scattering application datagram that is encrypted, for example the message count portion of the scattering application datagram header, the message type portion of the scattering application datagram header, and the data portion of the scattering application datagram.

At block 214, the method 200 comprises associating a second data packet embedding a second identification token to a second data packet source. At block 216, the method 200 comprises decrypting the second data packet using a second decryption key associated with the second data packet source. In an embodiment, the first data packet source is associated with a first plurality of different decryption keys and the first decryption key is one of the first plurality of decryption keys and the second data packet source is associated with a second plurality of different decryption keys and the second decryption key is one of the second plurality of decryption keys. In an embodiment, the method 200 further comprises storing a plurality of decrypted data packets by the scattering application in a data structure, wherein each stored decrypted data packet is associated with a sequence number and maintaining a next expected packet sequence number by the scattering application. When a decrypted data packet stored in the data structure is associated with the next expected packet sequence number, transmitting the decrypted data packet and a decrypted data packet stored in the data structure that has a sequence number next in order by the scattering application to a communication user device; and when a time-to-live value of a decrypted data packet stored in the data structure is due to expire, transmitting the decrypted data packet stored in the data structure having a time-to-live value due to expire to the communication user device. In an embodiment, the data structure is a doubly linked list data structure.

Figure 6:
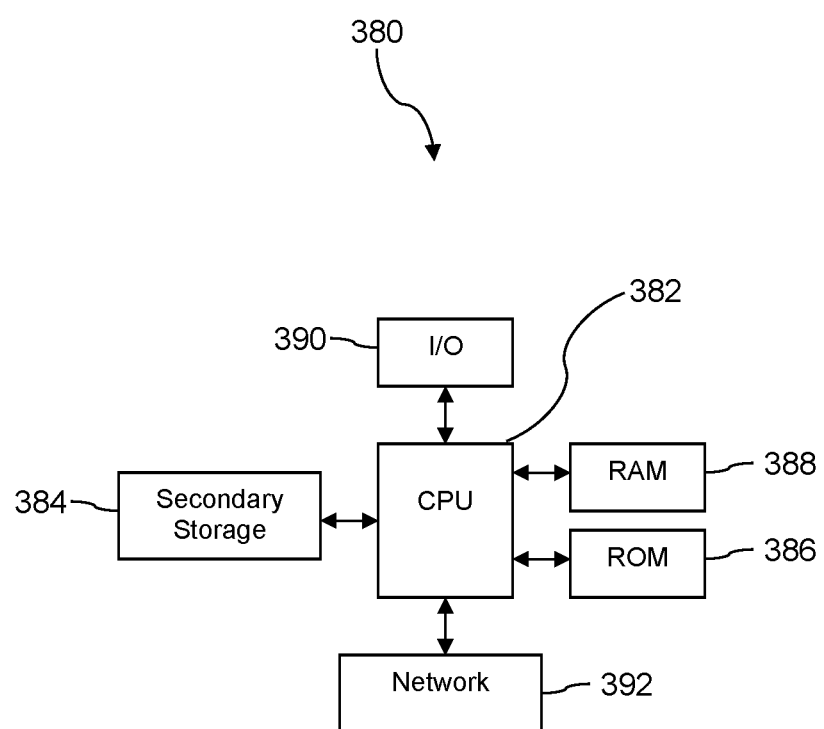
FIG. 6 is a block diagram of a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may be referred to as physical interfaces or physical network interfaces. The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards such as a WiFi physical interface, radio transceiver cards such as a wireless wide area network (WWAN) such as a cellular network physical interface, and/or other well-known network devices. A network connectivity device 392 may comprise an Ethernet-to-satellite wireless link physical interface. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

ADDITIONAL EMBODIMENTS

The following are non-limiting, specific embodiments in accordance with the present disclosure.

A first embodiment which is a scatter network device comprising a non-transitory memory; an at least one physical interface; an at least one processor; and a scattering application stored in the non-transitory memory. When executed by the processor, the scattering application establishes a plurality of logical communication channels, wherein each logical communication channel associates one of the at least one physical interface, a source Internet protocol (IP) address, and a destination IP address; receives a plurality of data packets from a first user system; scatters the plurality of data packets across the plurality of logical communication channels by sending at least some of the plurality of data packets via different logical communication channels to a counterpart scatter network device; and, for each logical communication channel, when the logical communication channel has been idle for a predefined period of time, sends a heartbeat packet via the logical communication channel to the counterpart scatter network device.

A second embodiment, which is the scatter network device of the first embodiment, wherein the scattering application sends each of the plurality of data packets over the plurality of logical communication channels in an encrypted format and, for each logical communication channel that has been idle for the predefined period of time, the heartbeat packet over the logical communication channel in an encrypted format.

A third embodiment, which is the scatter network device of the first or the second embodiment, wherein the predefined period of time is between 5 seconds and 360 seconds.

A fourth embodiment, which is the scatter network device of the first or the second embodiment, wherein the predefined period of time is between 6 seconds and 240 seconds.

A fifth embodiment, which is the scatter network device of the first or the second embodiment, wherein the predefined period of time is between 7 seconds and 1200 seconds.

A sixth embodiment, which is the scatter network device of the first or the second embodiment, wherein the predefined period of time is between 8 seconds and 60 seconds.

A seventh embodiment, which is the scatter network device of the first or the second embodiment, wherein the predefined period of time is between 8 seconds and 30 seconds.

An eighth embodiment, which is the scatter network device of the first or the second embodiment, wherein the predefined period of time is between 8 seconds and 20 seconds.

A ninth embodiment, which is the scatter network device of the first or the second embodiment, wherein the predefined period of time is between 8 seconds and 14 seconds.

A tenth embodiment, which is the scatter network device of any of the first through the ninth embodiment, wherein the plurality of data packets and the heartbeat packets are formatted as IP datagrams.

An eleventh embodiment, which is the scatter network device of the tenth embodiment, wherein a plurality of heartbeat packets are sent via a same logical communication channel to the counterpart scatter network device, and wherein the plurality of heartbeat packets comprises at least five bytes in the data portion of the IP datagram.

A twelfth embodiment, which is the scatter network device of the eleventh embodiment, wherein at least some plurality of heartbeat packets associated with the same logical communication channel have different numbers of bytes in the data portion of the IP datagrams.

A thirteenth embodiment, which is the scatter network device of any of the first through the twelfth embodiment, wherein scattering the plurality of data packets across the plurality of logical channels comprises the scattering application selecting logical communication channels to send different data packets randomly.

A fourteenth embodiment, which is the scatter network device of any of the first through the thirteenth embodiment, wherein the scattering application further receives data packets from the counterpart scatter network device via the plurality of logical communication channels; and for each logical communication channel, when no data packet has been received from the counterpart scatter network device and no heartbeat packet has been received from the counterpart scatter network device on the logical communication channel for a second predefined period of time, marks the logical communication channel as inoperative, wherein selecting logical communication channels to send different data packets randomly excludes logical communication channels marked as inoperative.

A fifteenth embodiment, which is the scatter network device of the fourteenth embodiment, wherein the second predefined period of time is longer than the predefined period of time.

A sixteenth embodiment, which is the scatter network device of the fifteenth embodiment, wherein the second predefined period of time is between 15 seconds and 480 seconds.

A seventeenth embodiment, which is the scatter network device of the fifteenth embodiment, wherein the second predefined period of time is between 20 seconds and 360 seconds.

An eighteenth embodiment, which is the scatter network device of the fifteenth embodiment, wherein the second predefined period of time is between 15 seconds and 240 seconds.

A nineteenth embodiment, which is the scatter network device of the fifteenth embodiment, wherein the second predefined period of time is between 15 seconds and 120 seconds.

A twentieth embodiment, which is the scatter network device of the fifteenth embodiment, wherein the second predefined period of time is between 15 seconds and 90 seconds.

A twenty-first embodiment, which is the scatter network device of the fifteenth embodiment, wherein the second predefined period of time is between 15 seconds and 60 seconds.

A twenty-second embodiment, which is the scatter network device of the fifteenth embodiment, wherein the second predefined period of time is between 15 seconds and 45 seconds.

A twenty-third embodiment, which is the scatter network device of the fifteenth embodiment, wherein the second predefined period of time is between 20 seconds and 40 seconds.

A twenty-fourth embodiment, which is the scatter network device of the fifteenth embodiment, wherein the second predefined period of time is between 25 seconds and 35 seconds.

A twenty-fifth embodiment, which is the scatter network device of the fifteenth embodiment, wherein the second predefined period of time is between 2.5 times and 3.5 times as long as the predefined period of time.

A twenty-sixth embodiment, which is the scatter network device of any of the first through the twenty-fifth embodiment, wherein the scattering application is compiled C language instructions.

A twenty-seventh embodiment, which is a method of secure data routing comprising establishing a first plurality of logical communication channels by a scattering application executing on a first computer system, wherein each of the first plurality of communication channels associates an Internet protocol (IP) address and a protocol port associated with the first computer system to an IP address and a protocol port associated with a second computer system; establishing a second plurality of logical communication channels by the scattering application, wherein each of the second plurality of logical communication channels associates an IP address and a protocol port associated with the first computer system to an IP address and a protocol port associated with a third computer system and wherein at least some of the second plurality of logical communication channels are associated with the same IP address and protocol port associated with the first computer system that some of the first plurality of logical communication channels are associated with; receiving a plurality of data packets by the scattering application via an IP address and a protocol port of the first computer system that is associated with one of the first plurality of logical communication channel and also associated with one of the second plurality of logical communication channels; parsing the data packets by the scattering application to find identification tokens embedded in the headers of the data packets; associating a first data packet embedding a first identification token to a first data packet source; decrypting the first data packet using a first decryption key associated with the first data packet source; associating a second data packet embedding a second identification token to a second data packet source; and decrypting the second data packet using a second decryption key associated with the second data packet source.

A twenty-eighth embodiment, which is the method of the twenty-seventh embodiment, wherein the data packets received by the scattering application comprise scattering application datagrams.

A twenty-ninth embodiment, which is the method of the twenty-eighth embodiment, wherein the scattering application datagrams comprise a header portion and a data portion.

A thirtieth embodiment, which is the method of the twenty-ninth embodiment, wherein the scattering application datagrams comprise a message authentication code (MAC).

A thirty-first embodiment, which is the method of the twenty-ninth or the thirtieth embodiment, wherein the header portion of the scattering application datagrams comprises an identity token.

A thirty-second embodiment, which is the method of any of the twenty-ninth through the thirty-first embodiments, wherein the header portion of the scattering application datagrams comprises a message count.

A thirty-third embodiment, which is the method of any of the twenty-ninth through the thirty-second embodiment, wherein the header portion of the scattering application datagrams comprises a message type.

A thirty-fourth embodiment, which is the method of any of the twenty-seventh through the thirty-third embodiment, wherein the first computer system is a virtual server.

A thirty-fifth embodiment, which is the method of any of the twenty-seventh through the thirty-third embodiment, wherein the first computer system is a plurality of virtual servers in a cloud computing environment.

A thirty-sixth embodiment, which is the method of any of the twenty-seventh through the thirty-third embodiment, wherein the first computer system is a server computer.

A thirty-seventh embodiment, which is the method of any of the twenty-seventh through the thirty-sixth embodiment, wherein the first data packet source is associated with a first plurality of different decryption keys and the first decryption key is one of the first plurality of decryption keys and wherein the second data packet source is associated with a second plurality of different decryption keys and the second decryption key is one of the second plurality of decryption keys.

A thirty-eighth embodiment, which is the method of any of the twenty-seventh through the thirty-seventh embodiment, further comprising storing a plurality of decrypted data packets by the scattering application in a data structure, wherein each stored decrypted data packet is associated with a sequence number; maintaining a next expected packet sequence number by the scattering application; when a decrypted data packet stored in the data structure is associated with the next expected packet sequence number, transmitting the decrypted data packet and a decrypted data packet stored in the data structure that has a sequence number next in order by the scattering application to a communication user device; and when a time-to-live value of a decrypted data packet stored in the data structure is due to expire, transmitting the decrypted data packet stored in the data structure having a time-to-live value due to expire to the communication user device.

A thirty-ninth embodiment, which is the method of thirty-eighth embodiment, wherein the data structure is a doubly linked list data structure.

A fortieth embodiment, which is a scatter network comprising a first scatter network node comprising a first non-transitory memory, at least a first processor, and a scatter network node application stored in the first non-transitory memory that, when executed by the at least the first processor of the first scatter network node, establishes a first plurality of logical communication channels, wherein each logical communication channel of the first plurality of logical communication channels associates a source Internet protocol (IP) address and a destination IP address and scatters a first plurality of data packets received from a data messaging source across the first plurality of logical communication channels by sending at least some of the first plurality of received data packets via different ones of the first plurality of logical communication channels to a counterpart scatter network node; and a first scatter network relay comprising a second non-transitory memory, at least a second processor, and a scatter network relay application stored in the second non-transitory memory that, when executed by the at least the second processor of the first scatter network relay, establishes a second plurality of logical communication channels, wherein each logical communication channel of the second plurality of logical communication channels associates a source Internet protocol (IP) address and a destination IP address, receives a second plurality of data packets from the first scatter network node via one of the first plurality of logical communication channels, wherein the second plurality of data packets is a sub-set of the first plurality of data packets, and scatters the second plurality of data packets across the second plurality of logical communication channels by sending at least some of the second plurality of data packets via different ones of the second plurality of logical communication channels to the counterpart scatter network node.

A forty-first embodiment, which is the scatter network of the fortieth embodiment, further comprising a second scatter network relay that establishes a third plurality of logical communication channels, wherein each logical communication channel of the third plurality of logical communication channels associates a source IP address and a destination IP address, and wherein one of the second plurality of logical communication channels associates its destination IP address to an IP address designating the second scatter network relay and wherein at least one of the third plurality of logical communication channel associates its destination IP address to an IP address designating the counterpart scatter network node.

A forty-second embodiment, which is the scatter network of the fortieth or forty-first embodiment, wherein the first scatter network node is a laptop computer, a smart phone, a desktop computer, a tablet computer, or a notebook computer.

A forty-third embodiment, which is the scatter network of any of the fortieth through the forty-second embodiments, wherein the counterpart scatter network node is a server computer.

A forty-fourth embodiment, which is the scatter network of any of the fortieth through the forty-second embodiment, wherein the counterpart scatter network node is a virtual server in a cloud computing environment.

A forty-fifth embodiment, which is the scatter network of any of the fortieth through the forty-fourth embodiment, wherein the first plurality of data packets are IP datagrams and at least some of the data portion of the IP datagrams is encrypted.

A forty-sixth embodiment, which is the scatter network of the forty-fourth embodiment, wherein the data portion of the IP datagram comprises a scattering application datagram and wherein a portion of the scattering application datagram is encrypted.

A forty-seventh embodiment, which is the scatter network of the forty-sixth embodiment, wherein the scattering application datagram comprises a header portion and a data portion, wherein a part of the header portion of the scattering application datagram is encrypted and the data portion of the scattering application datagram is encrypted.

A forty-eighth embodiment, which is the scatter network of the forty-seventh embodiment, wherein the header portion of the scattering application datagram comprises an identity token which is not encrypted.

A forty-ninth embodiment, which is the scatter network of the forty-seventh or forty-eighth embodiment, wherein the header portion of the scattering application datagram comprises a message count and a message type which are encrypted.

A fiftieth embodiment, which is the scatter network of any of the forty-sixth through the forty-ninth embodiments, wherein the scatter application datagram comprises a message authentication code (MAC) which is not encrypted.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of secure data routing, comprising:
establishing a first plurality of logical communication channels by a scattering application executing on a first computer system, wherein each of the first plurality of logical communication channels associates an Internet protocol (IP) address and a protocol port associated with the first computer system to an IP address and a protocol port associated with a second computer system;
establishing a second plurality of logical communication channels by the scattering application, wherein each of the second plurality of logical communication channels associates an IP address and a protocol port associated with the first computer system to an IP address and a protocol port associated with a third computer system and wherein at least some of the second plurality of logical communication channels are associated with the same IP address and protocol port associated with the first computer system that some of the first plurality of logical communication channels are associated with;

receiving a plurality of data packets by the scattering application via an IP address and a protocol port of the first computer system that is associated with one of the first plurality of logical communication channels and also associated with one of the second plurality of logical communication channels;

parsing the data packets by the scattering application to find identification tokens embedded in the headers of the data packets;

associating a first data packet embedding a first identification token to a first data packet source;

decrypting the first data packet using a first decryption key associated with the first data packet source;

associating a second data packet embedding a second identification token to a second data packet source;

decrypting the second data packet using a second decryption key associated with the second data packet source;

storing a plurality of decrypted data packets by the scattering application in a data structure, wherein each stored decrypted data packet is associated with a sequence number;

maintaining a next expected packet sequence number by the scattering application;

when a decrypted data packet stored in the data structure is associated with the next expected packet sequence number, transmitting the decrypted data packet and a decrypted data packet stored in the data structure that has a sequence number next in order by the scattering application to a communication user device; and when a time-to-live value of a decrypted data packet stored in the data structure is due to expire, transmitting the decrypted data packet stored in the data structure having a time-to-live value due to expire to the communication user device.

2. The method of claim 1, wherein the first computer system is a virtual server.

3. The method of claim 1, wherein the first computer system is a plurality of virtual servers in a cloud computing environment.

4. The method of claim 1, wherein the first computer system is a server computer.

5. The method of claim 1, wherein the first data packet source is associated with a first plurality of different decryption keys and the first decryption key is one of the first plurality of decryption keys and wherein the second data packet source is associated with a second plurality of different decryption keys and the second decryption key is one of the second plurality of decryption keys.

6. The method of claim 1, wherein the data structure is a doubly linked list data structure.

7. A computer system for secure data routing, comprising:
at least one non-transitory memory;
at least one processor; and
a scattering application stored in the at least one non-transitory memory that, when executed by the at least one processor:
establish a first plurality of logical communication channels, wherein each of the first plurality of logical communication channels associates an Internet protocol (IP) address and a protocol port associated with the computer system to an IP address and a protocol port associated with a second computer system, establish a second plurality of logical communication channels, wherein each of the second plurality of logical communication channels associates an IP address and a protocol port associated with the first computer system to an IP address and a protocol port associated with a third computer system and wherein at least some of the second plurality of logical communication channels are associated with the same IP address and protocol port associated with the first computer system that some of the first plurality of logical communication channels are associated with, receive a plurality of data packets via an IP address and a protocol port of the computer system that is associated with one of the first plurality of logical communication channels and also associated with one of the second plurality of logical communication channels, parse the data packets to find identification tokens embedded in the headers of the data packets, wherein a first data packet embedding a first identification token is associated to a first data packet source and a second data packet embedding a second identification token is associated to a second data packet source, and wherein the first data packet is decrypted using a first decryption key associated with the first data packet source and the second data packet is decrypted using a second decryption key associated with the second data packet source, stores a plurality of decrypted data packets in a data structure, wherein each
stored decrypted data packet is associated with a sequence number, maintains a next expected packet sequence number, when a decrypted data packet stored in the data structure is associated with the next expected packet sequence number, transmits the decrypted data packet and a decrypted data packet stored in the data structure that has a sequence number next in order to a communication user device, and when a time-to-live value of a decrypted data packet stored in the data structure is due to expire, transmits the decrypted data packet stored in the data structure having a time-to-live value due to expire to the communication user device.

8. The computer system of claim 7, wherein the computer system is a virtual server.

9. The computer system of claim 7, wherein the computer system is a plurality of virtual servers in a cloud computing environment.

10. The computer system of claim 7, wherein the computer system is a server computer.

11. The computer system of claim 7, wherein the first data packet source is associated with a first plurality of different decryption keys and the first decryption key is one of the first plurality of decryption keys and wherein the second data packet source is associated with a second plurality of different decryption keys and the second decryption key is one of the second plurality of decryption keys.

12. The computer system of claim 7, wherein the data structure is a doubly linked list data structure.

* * * * *